(12) United States Patent
Kamitani et al.

(10) Patent No.: US 7,466,283 B2
(45) Date of Patent: Dec. 16, 2008

(54) COIL ANTENNA STRUCTURE AND PORTABLE ELECTRONIC APPARATUS

(75) Inventors: Gaku Kamitani, Kyoto (JP); Hiroshi Marusawa, Moriyama (JP); Takehiro Konoike, Yasu (JP); Kazunari Kawahata, Machida (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 63 days.

(21) Appl. No.: 11/553,029

(22) Filed: Oct. 26, 2006

(65) Prior Publication Data

US 2007/0052600 A1 Mar. 8, 2007

Related U.S. Application Data

(63) Continuation of application No. PCT/JP2006/311831, filed on Jun. 13, 2006.

(30) Foreign Application Priority Data

Jun. 14, 2005 (JP) ............................ 2005-174099
Aug. 26, 2005 (JP) ............................ 2005-245541
Oct. 12, 2005 (JP) ............................ 2005-297223

(51) Int. Cl.
*H01Q 7/08* (2006.01)
(52) U.S. Cl. ....................................... 343/788; 343/702
(58) Field of Classification Search ................. 343/718, 343/799, 702, 788, 787
See application file for complete search history.

(56) References Cited

U.S. PATENT DOCUMENTS

| | | | |
|---|---|---|---|
| 5,005,690 A * | 4/1991 | Gonser | 198/350 |
| 7,023,395 B2 * | 4/2006 | Ohara et al. | 343/788 |
| 7,061,439 B1 * | 6/2006 | Minami et al. | 343/718 |
| 7,280,076 B2 | 10/2007 | Ninomiya et al. | |
| 2004/0130500 A1 | 7/2004 | Takei et al. | |

(Continued)

FOREIGN PATENT DOCUMENTS

JP 08-124749 A 5/1996

(Continued)

OTHER PUBLICATIONS

International Search Report issued in the corresponding International Application No. PCT/JP2006/311831, mailed on Jul. 18, 2006.

(Continued)

*Primary Examiner*—Tan Ho
(74) *Attorney, Agent, or Firm*—Keating & Bennett, LLP

(57) ABSTRACT

A coil antenna structure includes a first magnetic component extending in the thickness direction of a tabular primary casing. A second magnetic component and a third magnetic component, which are magnetically connected to the first magnetic component, are disposed on the first principal surface side and the second principal surface side of the primary casing, respectively. The first magnetic component is provided with a coil component surrounding it. In this manner, a U-shaped magnetic path is provided at an end portion of the primary casing so as to detour around a substrate defining an internal conductor. Likewise, a U-shaped magnetic path including fourth to sixth magnetic components is provided in a secondary casing defining a clamshell type casing together with the primary casing so as to detour around a substrate defining as an internal conductor.

39 Claims, 13 Drawing Sheets

U.S. PATENT DOCUMENTS

| | | |
|---|---|---|
| 2004/0140896 A1 | 7/2004 | Ohkawa et al. |
| 2005/0162331 A1 | 7/2005 | Endo et al. |
| 2007/0008235 A1* | 1/2007 | Tsukahara et al. .......... 343/788 |
| 2007/0023517 A1* | 2/2007 | Tan et al. .................... 235/435 |
| 2007/0024516 A1* | 2/2007 | Araki et al. ................. 343/788 |

FOREIGN PATENT DOCUMENTS

| | | |
|---|---|---|
| JP | 2000-113142 A | 4/2000 |
| JP | 2000-259785 A | 9/2000 |
| JP | 2001-016702 A | 1/2001 |
| JP | 2002-298095 A | 10/2002 |
| JP | 2002-341059 A | 11/2002 |
| JP | 2004-227046 A | 8/2004 |
| JP | 2004-265374 A | 9/2004 |
| JP | 2004-274609 A | 9/2004 |
| JP | 2005-122595 A | 5/2005 |

OTHER PUBLICATIONS

Official communication issued in counterpart Japanese Application No. 2006-529346, mailed on Sep. 16, 2008.

* cited by examiner

FIG.1A
FIG.1B
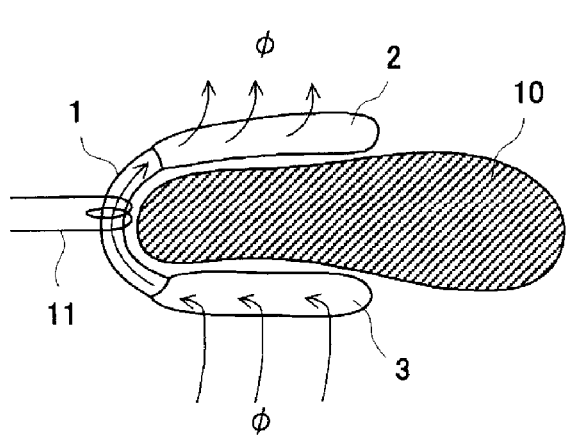
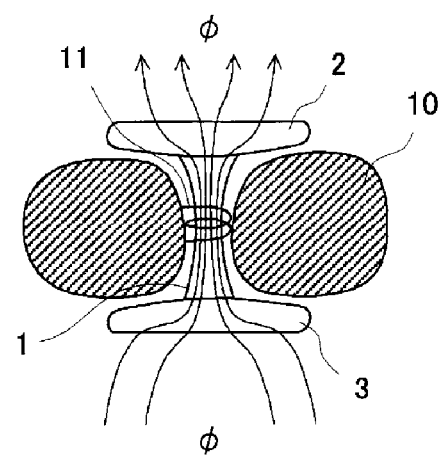

COIL ANTENNA STRUCTURE AND PORTABLE ELECTRONIC APPARATUS

BACKGROUND OF THE INVENTION

Field of the Invention

The present invention relates to a coil antenna provided in a portable electronic apparatus and a portable electronic apparatus including the coil antenna.

BACKGROUND OF THE INVENTION

Field of the Invention

A non-contact IC card, which has been widely used in recent years, is configured to communicate with a reader/writer while a magnetic flux from the reader/writer passes through a planar coil disposed in the card.

In a cellular phone or other suitable portable electronic apparatus including a non-contact IC card chip, the above-described planar coil is disposed in any one of the surfaces (in the vicinity of the surface) of the casing of the cellular phone. Since a circuit substrate including a ground electrode, a metal battery case, and other components are disposed, it is difficult for a magnetic flux to pass through the inside of the cellular phone. Therefore, a problem occurs in that a communication distance is reduced. Furthermore, there is a problem in that the sensitivity varies depending on a directional orientation. For example, communication may not be performed at all when a cellular phone is held over a reader/writer while being turned upside down.

In Japanese Unexamined Patent Application Publication No. 2000-113142 (Patent Document 1), a configuration in which a high-permeability magnetic material sheet is disposed between a coil antenna and an object is disclosed.

The information storage device disclosed in the above-described Patent Document 1 includes a sheet that is affixed to an affixation surface of the object. Therefore, when the device is applied to, for example, a cellular phone, it can be incorporated into the cellular phone by being affixed to, for example, a battery case of the cellular phone.

The above-described structure is effective against a magnetic flux from one side of the casing. However, it is ineffective against a magnetic flux from a side opposite thereto. Consequently, the problem is not solved, and communication cannot be performed when a cellular phone is disposed over a reader/writer while being turned upside down.

SUMMARY OF THE INVENTION

In order to overcome the above-described problems, preferred embodiments of the present invention provide a coil antenna device capable of communicating even when a portable electronic apparatus incorporating a non-contact IC card chip is held over a reader/writer while being turned upside down and ensuring a required amount of communication distance, and a portable electronic apparatus provided with the device.

A coil antenna and a portable electronic apparatus according to preferred embodiments of the present invention are described below.

A coil antenna includes a tabular casing having a first principal surface and a second principal surface opposed thereto and includes a magnetic component and a coil component surrounding the magnetic component in the casing, the magnetic component extending at least in the thickness direction of the casing and defining a magnetic path from the first principal surface side to the second principal surface side.

Preferably, the coil antenna is configured such that the above-described magnetic component defines a first magnetic component, and a second magnetic component magnetically connected to the first magnetic component is disposed on the first principal surface side of the above-described casing.

Preferably, the coil antenna is configured such that a third magnetic component magnetically connected to the first magnetic component is disposed on the second principal surface side of the above-described casing.

Preferably, the coil antenna is configured such that the first, second, and third magnetic components are composed of an integral magnetic component.

Preferably, the above-described integral magnetic component is a sheet-shaped magnetic component bent over the first principal surface and the second principal surface of the above-described casing.

Preferably, the coil antenna is configured such that a plurality of groups, each composed of the above-described first, second, and third magnetic components, are provided.

Preferably, the coil antenna is configured such that at least one of the second magnetic component and the third magnetic component is provided separately from the first magnetic component.

Preferably, the coil antenna is configured such that a gap is interposed between the first magnetic component and the second or the third magnetic component provided separately from the first magnetic component.

Preferably, the coil antenna is configured such that the cross-sectional areas of the second and the third magnetic components are specified to be larger than the cross-sectional area of the first magnetic component in the surface direction of the above-described casing.

Preferably, the coil antenna structure is configured such that the second and the third magnetic components are substantially in the shape of a sheet or a film.

Preferably, the coil antenna is configured such that the first magnetic component is substantially in the shape of a sheet or a film.

Preferably, the coil antenna is configured such that the first magnetic component is disposed in the vicinity of an end portion of the above-described casing.

Preferably, a circuit substrate is disposed in the above-described casing, the first magnetic component is disposed so as to penetrate the circuit substrate, and an incision portion extending in a direction farther from the first magnetic component is disposed at least in a conductor of a portion surrounding the first magnetic component of the circuit substrate.

Preferably, the above-described casing is provided with an electrically conductive frame for a liquid crystal display panel, and the above-described first magnetic component is disposed outside a loop formed from the electrically conductive frame.

Preferably, a constriction portion is provided on the outside of the above-described electrically conductive frame, and the above-described first magnetic component is disposed in the constriction portion.

Preferably, a magnetic barrier component for restricting passage of the magnetic flux through a route different from the above-described magnetic path including the above-described first magnetic component is disposed in the vicinity of the above-described first magnetic component.

Preferably, a magnetic barrier component for restricting passage of the magnetic flux through a route that is different from the above-described magnetic path including the above-described first magnetic component is disposed on at least one of opposed surfaces of the second and the third magnetic components or inside the opposed surfaces.

Preferably, the coil antenna is configured such that the above-described casing serves as a primary casing, a secondary casing defining a clamshell structure together with the primary casing is disposed, and the first magnetic component is disposed at a connection pivot portion of the primary casing for connecting the secondary casing.

Preferably, the coil antenna is configured such that the above-described casing serves as a primary casing, a secondary casing capable of being freely opened or closed relative to the primary casing is provided, and a fourth magnetic component is disposed in the secondary casing, the fourth magnetic component extending at least in the thickness direction of the secondary casing, defining a magnetic path from the first principal surface to the second principal surface of the secondary casing, and being magnetically connected to the first magnetic component while the secondary casing is closed relative to the primary casing.

Preferably, the coil antenna is configured such that a fifth magnetic component magnetically connected to the fourth magnetic component is disposed on the first principal surface side of the secondary casing, and a sixth magnetic component magnetically connected to the fourth magnetic component is disposed on the second principal surface side of the secondary casing.

Preferably, the coil antenna is configured such that the fifth and the sixth magnetic components are integral with the fourth magnetic component.

Preferably, the above-described integral magnetic component is a sheet-shaped magnetic component bent over the first principal surface and the second principal surface of the above-described secondary casing.

Preferably, the coil antenna is configured such that a plurality of groups, each composed of the above-described fourth, the fifth, and the sixth magnetic components, are provided.

Preferably, the coil antenna is configured such that at least one of the fifth magnetic component and the sixth magnetic component is provided separately from the fourth magnetic component.

Preferably, the coil antenna is configured such that a gap is interposed between the fourth magnetic component and the fifth or sixth magnetic component provided separately from the fourth magnetic component.

Preferably, the coil antenna is configured such that the cross-sectional areas of the fifth and the sixth magnetic components are greater than the cross-sectional area of the fourth magnetic component in the surface direction of the secondary casing.

Preferably, the coil antenna is configured such that the fifth and the sixth magnetic components are substantially in the shape of a sheet or a film.

Preferably, the coil antenna is configured such that the fourth magnetic component is substantially in the shape of a sheet or a film.

Preferably, the coil antenna is configured such that the fourth magnetic component is disposed in the vicinity of an end portion of the secondary casing.

Preferably, a circuit substrate is disposed in the above-described secondary casing, the fourth magnetic component is disposed so as to penetrate the circuit substrate, and an incision portion extending in a direction farther from the fourth magnetic component is disposed at least in a conductor of a portion surrounding the fourth magnetic component of the circuit substrate.

Preferably, the above-described secondary casing is provided with an electrically conductive frame for a liquid crystal display panel, and the above-described fourth magnetic component is disposed outside a loop formed from the electrically conductive frame.

Preferably, a constriction portion is provided on the outside of the above-described electrically conductive frame, and the above-described fourth magnetic component is disposed in the constriction portion.

Preferably, a magnetic barrier component for restricting passage of the magnetic flux through a route different from the above-described magnetic path including the above-described fourth magnetic component is disposed in the vicinity of the fourth magnetic component.

Preferably, a magnetic barrier component for restricting passage of the magnetic flux through a route different from the above-described magnetic path including the above-described fourth magnetic component is disposed on at least one of opposed surfaces of the above-described fifth and sixth magnetic components or in a space sandwiched by the opposed surfaces.

Preferably, the above-described casing is provided with an electrically conductive frame for a liquid crystal display panel, the frame surrounding the above-described magnetic path, and a nonconductive portion is disposed as a portion of the electrically conductive frame.

A coil antenna according to another preferred embodiment is configured to include a magnetic component disposed such that a magnetic flux is passed so as to detour around or penetrate a region having a relatively low magnetic permeability and a coil component surrounding the magnetic component.

Preferably, the coil antenna is configured such that the above-described magnetic component defines a first magnetic component, a second magnetic component magnetically connected to the first magnetic component is disposed on at least one end side of the first magnetic component, and the cross-sectional area of the second magnetic component is greater than the cross-sectional area of the first magnetic component in a direction that is substantially perpendicular to the extension direction of the first magnetic component.

A portable electronic apparatus according preferred embodiments of the present invention includes any one of the above-described coil antenna structures.

A coil antenna according to a preferred embodiment includes the magnetic component and the coil component surrounding the magnetic component in the tabular casing, the magnetic component extending in the thickness direction of the casing and defining the magnetic path from the first principal surface to the second principal surface. Consequently, the magnetic component defines the magnetic path of a magnetic flux to pass from the first principal surface to the second principal surface side or in a direction opposite thereto, and the coil component is disposed in the magnetic path, so that, for example, when a chip of a non-contact IC card is connected to the coil antenna, communication can be performed by holding the casing over a reader/writer, when either the surface on the first principal surface side or the second principal surface side is aimed at the reader/writer.

The second magnetic component magnetically connected to the first magnetic component extending in the thickness direction of the casing is disposed on the first principal surface side of the casing. Consequently, the magnetic resistance of the magnetic path is reduced, the convergence of the magnetic flux is improved, and the flux density passing through the coil component is increased, such that the communication distance from the reader/writer can be increased.

The third magnetic component is magnetically connected to the first magnetic component. Consequently, the convergence of a magnetic flux on the first magnetic component is further improved.

The second and the third magnetic components are integrated together with, for example, the first magnetic component. Consequently, leakage of a magnetic flux is prevented, and the convergence of a magnetic flux on the first magnetic component is improved.

The integral magnetic component includes the sheet-shaped magnetic component bent over the first principal surface and the second principal surface of the casing. Consequently, a magnetic path is constructed in a limited space, and a portable electronic apparatus is constructed without increasing the size of the casing.

The plurality of groups, each composed of the first, second, and third magnetic components, are disposed. Consequently, the communication sensitivity and the stability thereof are improved.

At least one of the second magnetic component and the third magnetic component is provided separately from the first magnetic component. Consequently, the incorporation into the casing is easily performed.

A similar effect can be exerted by interposing the gap between the first magnetic component and the second or third magnetic component provided separately from the first magnetic component.

The cross-sectional areas of the second and third magnetic components in the surface direction of the casing are greater than the cross-sectional area of the first magnetic component. Consequently, the convergence of a magnetic flux on the first magnetic component is effectively improved while the volume of the first magnetic component surrounded by the coil component in the casing is maintained small.

The second and third magnetic components are preferably substantially in the shape of a sheet or a film. Consequently, the volume occupied by the second and third magnetic components in the casing is reduced, and the entire apparatus can be miniaturized.

A miniaturization effect can be further enhanced by configuring the first magnetic component to be substantially in the shape of a sheet or a film.

The first magnetic component is disposed in the vicinity of the end portion of the casing. Consequently, interference of the substrate arrangement in the casing is prevented, and the space is efficiently used.

The first magnetic component is disposed so as to penetrate the circuit substrate in the casing, and an incision portion is disposed in a portion surrounding the first magnetic component of the circuit substrate. Consequently, a counter-electromotive force caused by an eddy current generated in the circuit substrate when a magnetic flux passes through the first magnetic component is suppressed, and a reduction in effective magnetic permeability of the first magnetic component is suppressed.

The above-described first magnetic component is disposed outside the loop formed from the electrically conductive frame for a liquid crystal display panel included in the above-described casing. Consequently, no eddy current flows through the electrically conductive frame when a magnetic flux passes through the first magnetic component, such that no counter-electromotive force caused by an eddy current is generated and a reduction in effective magnetic permeability of the first magnetic component is avoided.

The constriction portion is provided on the outside of the electrically conductive frame for a liquid crystal display panel, and the first magnetic component is disposed in the constriction portion. Consequently, the first magnetic component can be disposed outside the loop formed from the electrically conductive frame without reducing the size of the electrically conductive frame.

The magnetic barrier component for restricting passage of the magnetic flux through a route different from the magnetic path including the first magnetic component is disposed in the vicinity of the first magnetic component. Consequently, a magnetic flux interlinking with the coil component is further converged.

The magnetic barrier component for restricting passage of the magnetic flux through a route different from the magnetic path including the first magnetic component is disposed on at least one of the opposed surfaces of the second and third magnetic components or in the space sandwiched by the opposed surfaces. Consequently, a magnetic flux interlinking with the coil component is further converged.

The first magnetic component is disposed at the connection pivot portion for connecting the secondary casing to the primary casing provided with the magnetic component and the coil component. Consequently, interference by the secondary casing is prevented.

In the structure including the primary casing and the secondary casing capable of being freely opened or closed relative to the primary casing, the fourth magnetic component defining the magnetic path from the first principal surface to the second principal surface of the secondary casing is disposed, and this fourth magnetic component is magnetically connected to the first magnetic component on the primary casing side. Consequently, the magnetic path penetrating the primary casing and the secondary casing is provided, and the function as the coil antenna is performed even when the secondary casing is closed relative to the primary casing.

The fifth and sixth magnetic components magnetically connected to the fourth magnetic component are disposed on the first and the second principal surfaces of the above-described secondary casing. Consequently, the magnetic resistance of the magnetic path in the secondary casing is reduced, and the convergence of the magnetic flux is improved.

When the fifth and sixth magnetic components are formed integrally together with the fourth magnetic component, the number of components is reduced, and the leakage of magnetic flux is further reduced.

The integral magnetic component is composed of the sheet-shaped magnetic component bent over the first principal surface and the second principal surface of the secondary casing. Consequently, a magnetic path is constructed in a limited space, and a portable electronic apparatus is constructed without increasing the size of the casing.

The plurality of groups, each composed of the fourth, fifth, and sixth magnetic components, are disposed. Consequently, the communication sensitivity and the stability thereof are improved.

At least one of the fifth magnetic component and the sixth magnetic component is provided separately from the fourth magnetic component. Consequently, the flexibility of arrangement of these magnetic components in the secondary casing is easily increased.

A similar effect is provided by interposing the gap between the fourth magnetic component and the fifth or sixth magnetic component provided separately from the fourth magnetic component.

The cross-sectional areas of the fifth and sixth magnetic components in the surface direction of the casing are greater than the cross-sectional area of the fourth magnetic component. Consequently, the volume of the fourth magnetic component included in the inside of the secondary casing is reduced, and the entire apparatus can be miniaturized.

The fifth and sixth magnetic components are substantially in the shape of a sheet or a film. Consequently, the volume occupied by the fifth and sixth magnetic components in the casing is reduced, and the entire apparatus can be miniaturized.

A miniaturization effect can be further improved by configuring the fourth magnetic component to be substantially in the shape of a sheet or a film.

The fourth magnetic component is disposed in the vicinity of the end portion of the casing. Consequently, interference of the substrate arrangement in the casing is prevented, and the space is efficiently used.

The fourth magnetic component is disposed so as to penetrate the circuit substrate in the secondary casing, and the incision portion is disposed in a portion surrounding the fourth magnetic component of the circuit substrate. Consequently, a counter-electromotive force caused by an eddy current generated in the circuit substrate when a magnetic flux passes through the fourth magnetic component is suppressed, and a reduction in effective magnetic permeability of the fourth magnetic component is suppressed.

The above-described fourth magnetic component is disposed outside the loop formed from the electrically conductive frame for a liquid crystal display panel included in the above-described casing. Consequently, no eddy current flows through the electrically conductive frame when a magnetic flux passes through the first magnetic component, so that no counter-electromotive force due to an eddy current is generated and a reduction in effective magnetic permeability of the fourth magnetic component is avoided.

The constriction portion is provided on the outside of the electrically conductive frame for a liquid crystal display panel, and the fourth magnetic component is disposed in the constriction portion. Consequently, the fourth magnetic component is disposed outside the loop formed from the electrically conductive frame without reducing the size of the electrically conductive frame.

The magnetic barrier component for restricting passage of the magnetic flux through a route different from the magnetic path including the fourth magnetic component is disposed in the vicinity of the fourth magnetic component. Consequently, a magnetic flux interlinking with the coil component is further converged.

The magnetic barrier component for restricting passage of the magnetic flux through a route different from the magnetic path including the fourth magnetic component is disposed on at least one of the opposed surfaces of the fifth and sixth magnetic components or in the space sandwiched by the opposed surfaces. Consequently, a magnetic flux interlinking with the coil component is further converged.

The nonconductive portion is disposed as a portion of the electrically conductive frame for a liquid crystal display panel, the frame surrounding the magnetic path. Consequently, eddy current is prevented from passing through the electrically conductive frame, so that no counter-electromotive force is generated due to an eddy current, and a reduction in effective magnetic permeability of the first and/or the fourth magnetic component is avoided.

The magnetic component and the coil component surrounding the magnetic component are disposed such that a magnetic flux is passed so as to detour around or penetrate a region having a relatively low magnetic permeability. Consequently, communication can be performed by holding a portable electronic apparatus provided with this coil antenna structure over a reader/writer to communicate with a non-contact IC chip provided with a coil antenna, when either the surface on the right side or the back side is aimed at the reader/writer.

The second magnetic component magnetically connected to the first magnetic component is disposed on at least one end side of the first magnetic component, and the cross-sectional area of the second magnetic component is greater than the cross-sectional area of the first magnetic component in a direction that is substantially perpendicular to the extension direction of the first magnetic component. Consequently, the convergence of a magnetic flux on the first magnetic component is effectively improved while the volume of the first magnetic component surrounded by the coil component in the casing is maintained small. Therefore, the entire apparatus can be miniaturized.

According to the portable electronic apparatus of preferred embodiments of the present invention, communication with a reader/writer can be performed by holding a tabular casing over the reader/writer, while any one of the surfaces thereof is aimed at the reader/writer.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 1A and 1B are diagrams showing a coil antenna structure according to a first preferred embodiment of the present invention.

DETAILED DESCRIPTION OF PREFERRED EMBODIMENTS

Figure 2A:
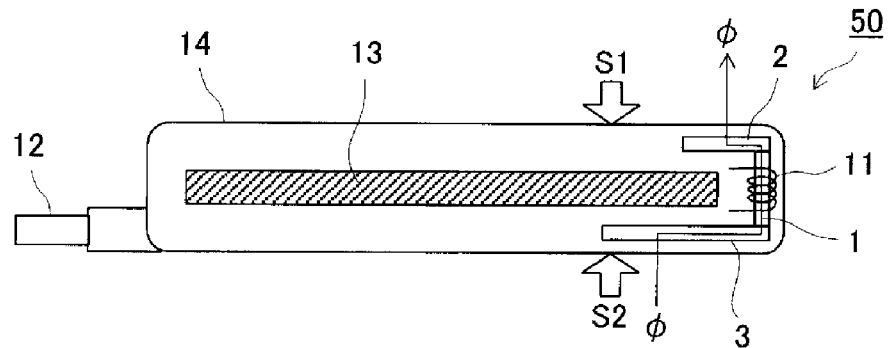
FIGS. 2A-2C are diagrams showing the configuration of a cellular phone provided with a coil antenna structure according to a second preferred embodiment of the present invention.

A coil antenna according to a first preferred embodiment of the present invention will be described with reference to FIG. 1.

FIGS. 1A and 1B are sectional views showing two types of coil antennas. In an example shown in FIG. 1A, a conductor 10 having a predetermined thickness and extension in the surface direction and exhibiting a relatively low magnetic permeability is provided, and a first magnetic component 1 extending in the thickness direction of the conductor 10 is disposed at an end portion of the conductor 10. On a first principal surface (upper surface in the drawing) side of the conductor 10, a second magnetic component 2 is magnetically connected to the first magnetic component 1. Furthermore, a third magnetic component 3 magnetically connected to the first magnetic component 1 is disposed on a second principal surface (lower surface in the drawing) side of the conductor 10.

In this manner, the first magnetic component 1 is disposed along the end portion of the conductor 10, and the second magnetic component 2 and the third magnetic component 3 are disposed along the surface directions of the first principal surface and the second principal surface, respectively, of the conductor 10. Consequently, the cross-sectional areas of the second magnetic component 2 and the third magnetic component 3 are greater than the cross-sectional area of the first magnetic component 1 with respect to the surface directions of the first and the second principal surfaces of the conductor 10.

Ferrite having a relative magnetic permeability of about 15 is used for each of the first magnetic component 1, the second magnetic component 2, and the third magnetic component 3. A higher relative magnetic permeability of at least about 10 is preferable. It is more preferable that the relative magnetic permeability is specified to be at least about 30. Where the magnetic component is disposed in the vicinity of a receptacle of a cellular phone, an eddy current may pass the magnetic component due to a current during charging, and a loss may be produced. Therefore, it is preferable that the material has a resistivity of at least about $10^{10}$ [Ω·cm], and more preferably, at least about $10^{11}$ [Ω·cm].

The first magnetic component 1 is provided with a coil component 11 (pick up coil) in which a conductor is wound so as to surround the first magnetic component 1. When a magnetic field is applied upward from the bottom in the drawing, the magnetic flux φ extends upward past a route of the third magnetic component 3→the first magnetic component 1→the second magnetic component 2. At that time, since the second magnetic component 2 and the third magnetic component 3 extend along the surface directions of the first and the second principal surfaces of the conductor 10, the convergence of the magnetic flux is increased. Consequently, the density of the magnetic flux passing the first magnetic component 1 is increased.

Since the magnetic flux φ passes through the first magnetic component provided with the coil component 11 so as to detour around the conductor 10, as described above, when the applied magnetic field is modulated, it can be transmitted as a signal or an electric power from the coil component 11.

The above-described structure functions as a coil antenna which establishes magnetic field connection when the surface on the second magnetic component 2 side or the third magnetic component 3 side is simply disposed on a region suitable for directing a magnetic field toward the thickness direction of the conductor 10. Communication with a circuit of an external reader/writer or other suitable device is possible when a transmitter signal passes the coil component 11 by the action of a circuit connected to the coil component 11.

For example, when a non-contact IC chip connected to the coil component 11 is provided, the communication with a reader/writer for a non-contact IC chip is possible by simply disposing any one of the first principal surface or the second principal surface of the conductor 10 over the reader/writer.

In an example shown in FIG. 1B, a conductor having a predetermined thickness and extension in the surface direction and exhibiting a relatively low magnetic permeability (a conductor 10) is provided, and a first magnetic component 1 is disposed so as to penetrate the inside of the conductor 10. A second magnetic component 2 is disposed on a first principal surface (upper surface in the drawing) side of the conductor 10 and a third magnetic component 3 is disposed on a second principal surface (lower surface in the drawing) side of the conductor 10 relative to this first magnetic component 1, and the second and the third magnetic components 2 and 3 are magnetically connected to the first magnetic component 1.

The cross-sectional areas of the second magnetic component 2 and the third magnetic component 3 are greater than the cross-sectional area of the first magnetic component 1 with respect to the surface directions of the first and the second principal surfaces of the conductor 10. That is, the first magnetic component 1 is disposed so as to penetrate a portion of the conductor 10, and the second magnetic component 2 and the third magnetic component 3 are disposed so as to extend in the surface directions of the first principal surface and the second principal surface, respectively, of the conductor 10.

The first magnetic component 1 is provided with a coil component 11 (pick up coil) in which a conductor is wound so as to surround the first magnetic component 1. When a magnetic field is applied upward from the bottom in the drawing, the magnetic flux φ extends upward past a route of the third magnetic component 3→the first magnetic component 1→the second magnetic component 2. At that time, since the second magnetic component 2 and the third magnetic component 3 extend along the surface directions of the first and the second principal surfaces of the conductor 10, the convergence of the magnetic flux is increased. Consequently, the magnetic flux density passing the first magnetic component 1 is increased and, in addition, a wider positional relationship suitable for being in the state of being connected to the antenna portion of the above-described reader/writer is ensured.

In the examples shown in FIGS. 1A and 1B, each of the second magnetic component 2 and the third magnetic component 3 is magnetically connected to the first magnetic component 1. However, among these, any one of the second and the third magnetic components may be magnetically connected to the first magnetic component 1. The first magnetic component 1 extending in the thickness direction of the conductor 10 may be disposed alone. In every case, the convergence of the magnetic flux is reduced. However, miniaturization and cost reduction is facilitated because the constituent factors are simplified.

A cellular phone according to a second preferred embodiment will be described below with reference to FIGS. 2A-2C.

FIG. 2A is a sectional view of a portion of a cellular phone. A casing 14 of the cellular phone 50 has a tabular shape. A circuit substrate (hereafter simply referred to as a "substrate") 13 defining an electronic circuit is disposed in the inside of the casing 14. A first magnetic component 1 is disposed at an end portion of the casing 14. This first magnetic component 1 is provided with a coil component 11 in which a conductor coil is wound so as to surround a magnetic flux passing the first magnetic component. A second magnetic component 2 magnetically connected to the first magnetic component 1 is disposed on a first principal surface (upper surface in the drawing) S1 side of the casing 14. Furthermore, a third magnetic component 3 magnetically connected to the first magnetic component 1 is disposed on a second principal surface (lower surface in the drawing) S2 side of the casing 14. The cross-sectional areas of the second magnetic component 2 and the third magnetic component 3 are greater than the cross-sectional area of the first magnetic component 1 with respect to the surface direction of the casing 14 (the surface directions of the first and the second principal surfaces of the substrate 13).

The above-described substrate 13 in the casing 14 extends to the vicinity of the end portion thereof. Therefore, a magnetic path composed of the first magnetic component 1, the second magnetic component 2, and the third magnetic component 3 is disposed so as to detour around the substrate 13.

When a magnetic field is applied upward from the bottom in the drawing, the magnetic flux φ extends upward past a route of the third magnetic component 3→the first magnetic component 1→the second magnetic component 2. Since the second magnetic component 2 and the third magnetic component 3 extend along the surface directions of the first and the second principal surfaces of the casing 14, that is, the direction perpendicular to the direction of the magnetic field, the convergence of the magnetic flux is increased. Consequently, the magnetic flux density passing the first magnetic component 1 is increased.

Furthermore, an antenna 12 for the cellular phone is disposed at the end portion opposite to the end portion at which the first magnetic component 1 of the casing 14 is disposed.

A non-contact IC chip is connected to the above-described coil component 11. This non-contact IC chip, the coil component 11, and the first to third magnetic components 1 to 3 define a data carrier used for RFID (Radio Frequency Identification (non-contact data identification technology)).

Figure 2B:
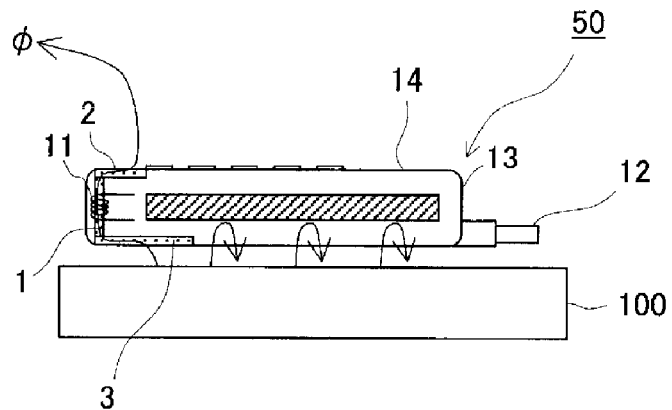
Figure 2C:
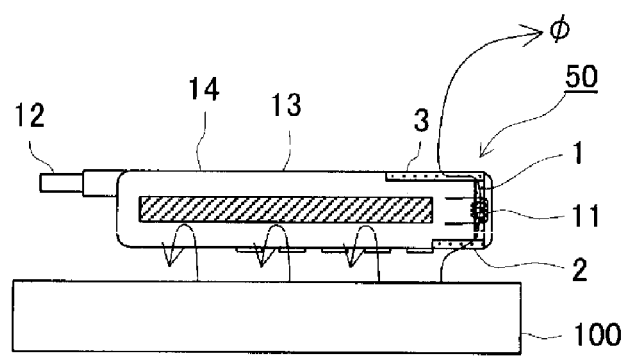

FIGS. 2B and 2C show the states in which the cellular phone is disposed over a reader/writer of the RFID. In the state shown in FIG. 2B, the surface (key control portion surface) of the cellular phone is directed upward, and the back surface is aimed at the reader/writer 100. Conversely, in the state shown in FIG. 2C, the surface of the cellular phone is aimed at the reader/writer 100.

The reader/writer 100 radiates a magnetic flux such that a magnetic field is directed in a direction perpendicular to the surface (a surface over which the cellular phone is disposed) thereof. Since a magnetic path composed of the first to the third magnetic components 1 to 3 is disposed in the casing 14 of the cellular phone 50, the magnetic flux φ radiates from the reader/writer 100 passes the magnetic path and extends upward from the upper surface of the casing 14. In an example shown in FIG. 2B, the magnetic flux φ passes a route of the third magnetic component 3→the first magnetic component 1→the second magnetic component 2, and in an example shown in (C), the magnetic flux φ passes a route of the second magnetic component 2→the first magnetic component 1→the third magnetic component 3.

Since magnetic lines of force form a closed loop, the magnetic flux extending upward returns to the antenna portion of the reader/writer 100 through the surroundings.

In this manner, the entire magnetic path including the first magnetic component 1 wound with the coil component 11 has a U-shape. Consequently, an electric power can be supplied to and communication can be performed with the IC chip through the use of electromagnetic induction due to the magnetic flux converged by the second magnetic component 2 and the third magnetic component 3. Therefore, it is possible to mutually communicate with the reader/writer 100 regardless of whether the right side or back side of the cellular phone 50 is disposed adjacent to the reader/writer 100.

A capacitor is connected to the above-described coil component 11 so as to define a resonant circuit. The resonant frequency thereof corresponds to the resonant frequency of an electromagnetic wave transmitted from the reader/writer 100, and is set at about 13.56 MHz, for example. The resonant circuit of the non-contact IC chip receives an electromagnetic field from the reader/writer 100 by a resonant operation of the above-described resonant circuit, converts the received electromagnetic field to an electric signal, and supplies the electric signal to the IC chip. The IC chip performs writing to or reading from internal memory and, thereafter, induces voltage variation on the reader/writer side of an external apparatus through a switching operation by an FET in the IC chip, so as to perform non-contact communication.

The above-described first to third magnetic components 1 to 3 may preferably be constructed by molding a mixed material of a ferrite powder and a resin. Alternatively, they may be formed by applying a ferrite resin paste to cellular phone inner wall portions. When the first to third magnetic components 1 to 3 are composed of the mixed material including the ferrite powder, as described above, the impact resistance and the weight reduction of the first to third magnetic components is achieved, and an antenna can be configured to be resistant to breakage due to a drop of the cellular phone. Since the first magnetic component 1 provided with the coil component 11, on which a magnetic flux is concentrated, has a small cross-sectional area, it is desirable that the magnetic permeability is increased as compared with those of the second and the third magnetic components by using a high magnetic permeability ferrite powder, increasing the volume ratio of the ferrite powder, or increasing the particle diameter of the ferrite powder. Therefore, the first magnetic component may be easily composed of a sintered magnetic material.

A cellular phone according to a third preferred embodiment will be described below with reference to FIGS. 3A and 3B.

In this example, a so-called clamshell structure is provided, in which a secondary casing 18 is connected to a primary casing 17 with a connection pivot 19 so as to be freely opened or closed. In this example, a first magnetic component 1 extending in the thickness direction of the primary casing 17 is disposed in the portion of the connection pivot 19 of the primary casing 17 connected to the secondary casing 18, and the first magnetic component 1 is provided with a coil component 11. A second magnetic component 2 magnetically connected to the first magnetic component 1 is disposed on the first principal surface (upper surface in FIG. 3A) side of the primary casing 17.

Furthermore, a third magnetic component 3 magnetically connected to the first magnetic component 1 is disposed on the second principal surface (lower surface in the drawing) side of the primary casing 17.

Figure 3A:
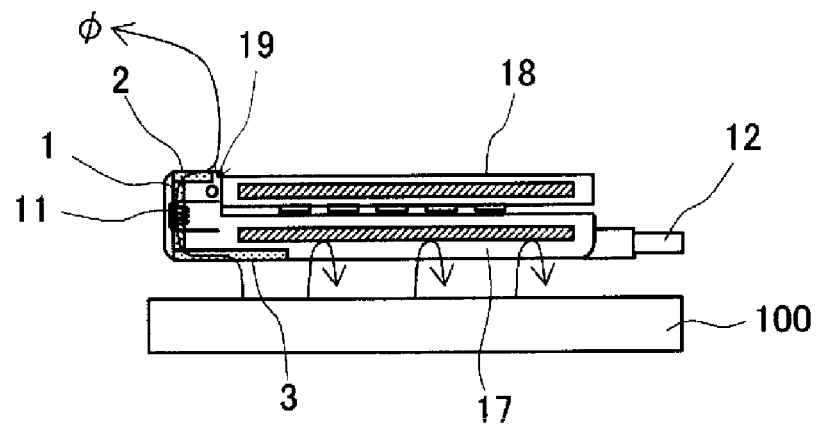
FIGS. 3A and 3B are diagrams showing the configuration of a cellular phone provided with a coil antenna structure according to a third preferred embodiment of the present invention.
Figure 3B:
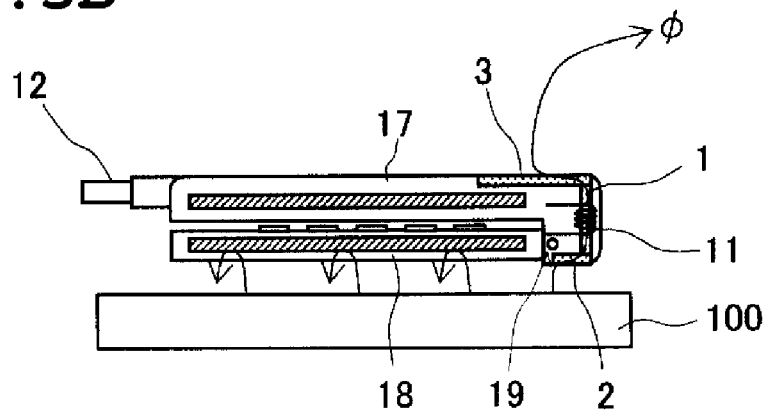

FIG. 3A shows the state in which an upper surface is the secondary casing 18 side and a lower surface is the primary casing 17 side. Conversely, FIG. 2B shows the state in which a lower surface is the secondary casing 18 side and an upper surface is the primary casing 17 side.

A reader/writer 100 radiates a magnetic flux such that a magnetic field is directed in a direction perpendicular to the surface (a surface over which the cellular phone is held) thereof. This magnetic flux passes a magnetic path composed of the first to the third magnetic components 1 to 3 of a cellular phone, and comes upward. In the example shown in FIG. 3A, the magnetic flux $\phi$ passes a route of the third magnetic component 3→the first magnetic component 1→the second magnetic component 2, and in the example shown in (B), the magnetic flux $\phi$ passes a route of the second magnetic component 2→the first magnetic component 1→the third magnetic component 3.

In this manner, the entire magnetic path including the first magnetic component 1 wound with the coil component 11 has a U-shape. Consequently, an electric power can be supplied to and communication of signals can be performed with the IC chip through the use of electromagnetic induction due to the magnetic flux converged by the second magnetic component 2 and the third magnetic component 3. Therefore, it is possible to communicate mutually with the reader/writer 100 regardless of whether the right side or back side of the cellular phone is disposed adjacent to the reader/writer 100.

A cellular phone according to a fourth preferred embodiment will be described below with reference to FIG. 4.

This cellular phone 50 also has a so-called clamshell structure, in which a secondary casing 18 is connected to a connection pivot 19 of a primary casing 17 so as to be freely opened or closed. In the third preferred embodiment, the U-shaped magnetic path composed of the first to the third magnetic components is provided in the connection pivot portion thereof. However, in the fourth preferred embodiment, a magnetic path is provided in the end portions overlapping one another while the secondary casing 18 is closed relative to the primary casing 17.

At the end portion of the primary casing 17, the second magnetic component 2 is disposed in the first principal surface (upper surface in the drawing) of the primary casing 17, and the third magnetic component 3 is disposed in the second principal surface (lower surface in the drawing) of the primary casing 17. At the end portion of the secondary casing 18, a fourth magnetic component 4, which is magnetically connected to the above-described first magnetic component 1 while the secondary casing 18 is closed relative to the primary casing 17, is disposed, a fifth magnetic component 5 magnetically connected to the fourth magnetic component 4 is disposed on the first principal surface (upper surface in the drawing) side of the secondary casing 18, and a sixth magnetic component 6 magnetically connected to the fourth magnetic component 4 is disposed on the second principal surface (lower surface in the drawing) side of the secondary casing 18.

The cross-sectional areas of the second magnetic component 2 and the third magnetic component 3 are greater than the cross-sectional area of the first magnetic component 1 with respect to the surface directions of the first and the second principal surfaces of the primary casing 17. Likewise, the cross-sectional areas of the fifth magnetic component 5 and the sixth magnetic component 6 are greater than the cross-sectional area of the fourth magnetic component 4 with respect to the surface directions of the first and the second principal surfaces of the secondary casing 18.

The magnetic path composed of the first to the third magnetic components 1 to 3 on the primary casing 17 side has a U-shape and detours around an end portion of a substrate 15 in the inside of the primary casing 17. Likewise, the magnetic path composed of the fourth to the sixth magnetic components 4 to 6 on the secondary casing 18 side has a U-shape and detours around an end portion of a substrate 16 on the secondary casing 18 side.

Figure 4:
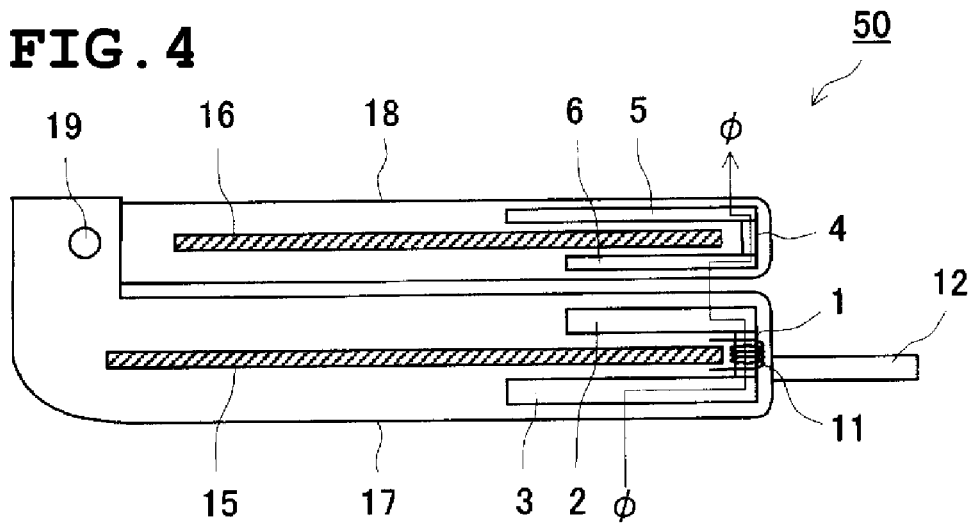
FIG. 4 is a diagram showing the configuration of a cellular phone provided with a coil antenna structure according to a fourth preferred embodiment of the present invention.

As shown in FIG. 4, the above-described magnetic path on the primary casing 17 side is magnetically connected to the above-described magnetic path on the secondary casing 18 while the secondary casing 18 is closed relative to the primary casing 17. Consequently, as indicated by the magnetic flux $\phi$, the magnetic flux passes through these magnetic paths in the thickness direction of the casings (17 and 18), and a required amount of magnetic flux density passing through the portion of the coil component 11 is ensured.

FIGS. 5A-5D shows various states in which this cellular phone is disposed over a reader/writer of RFID. In the state shown in FIG. 5A, the primary casing 17 side is aimed at the reader/writer 100 while the secondary casing 18 is closed relative to the primary casing 17. Conversely, in the state shown in FIG. 5B, the secondary casing 18 side is aimed at the reader/writer 100 while the secondary casing 18 is closed relative to the primary casing 17. In the state shown in FIG. 5C, a key control surface and a liquid crystal panel surface are disposed over the reader/writer 100 while the secondary casing 18 is opened partway relative to the primary casing 17. In the state shown in FIG. 5D, the back surface side of the liquid crystal panel is disposed over the reader/writer 100 while the secondary casing 18 is opened partway relative to the primary casing 17.

Figure 5A:
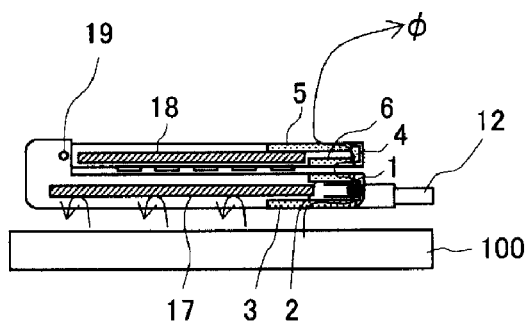
FIGS. 5A-5D are diagrams showing some states in which the cellular phone according to the fourth preferred embodiment of the present invention is disposed over a reader/writer.
Figure 5B:
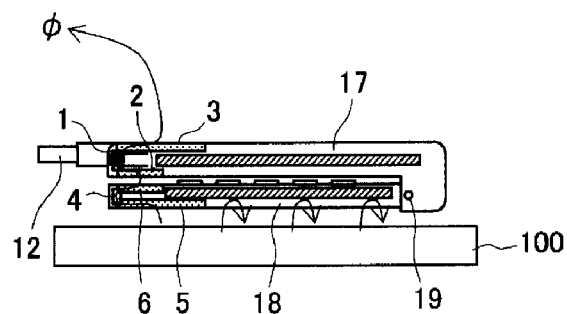

In the example shown in FIG. 5A, the magnetic flux $\phi$ passes a route of the third magnetic component 3→the first magnetic component 1→the second magnetic component 2→the sixth magnetic component 6→the fourth magnetic component 4→the fifth magnetic component 5, and in the example shown in FIG. 5B, the magnetic flux $\phi$ passes in a direction opposite thereto. In each case, the magnetic flux $\phi$ passes through the coil component disposed on the first magnetic component 1.

Figure 5C:
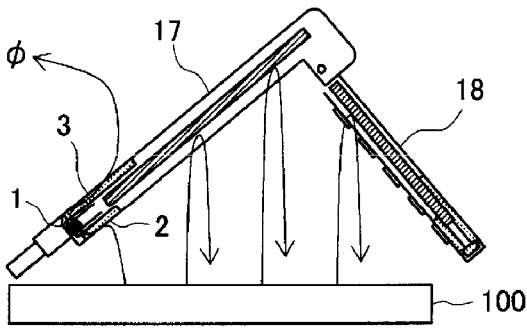
Figure 5D:
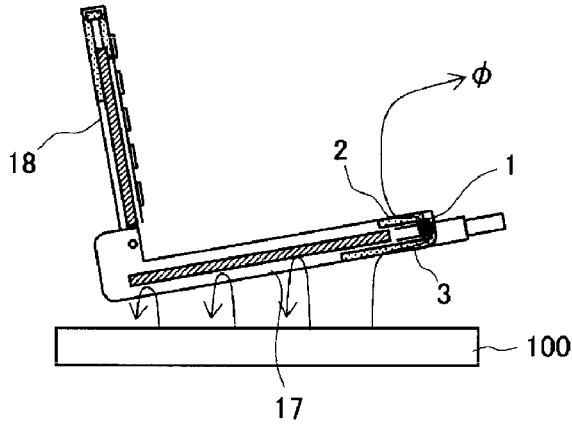

In the example shown in FIG. 5C, the magnetic flux $\phi$ passes a route of the second magnetic component 2→the first magnetic component 1→the third magnetic component 3, and in the example shown in FIG. 5D, the magnetic flux $\phi$ passes in a direction opposite thereto. In each case, the magnetic flux $\phi$ passes through the coil component disposed on the first magnetic component 1.

In this manner, it is possible to communicate with the reader/writer 100 even when the cellular phone is disposed over the reader/writer 100 in various arrangements.

The configuration of a cellular phone according to a fifth preferred embodiment will be described below with reference to FIG. 6.

Figure 6:
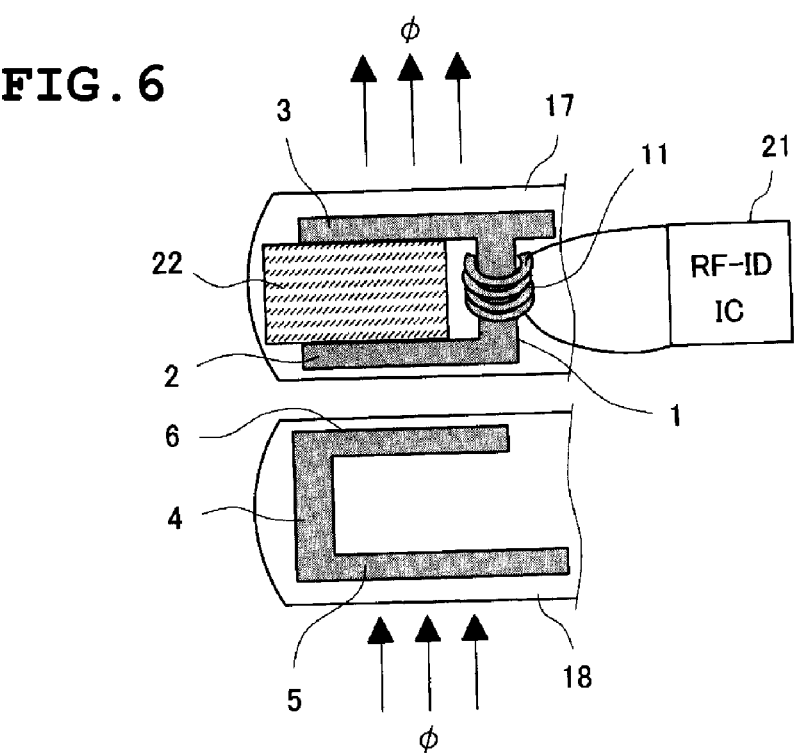
FIG. 6 is a diagram showing the configuration of a cellular phone provided with a coil antenna structure according to a fifth preferred embodiment of the present invention.

FIG. 6 is a sectional view of a key portion thereof. In the fourth preferred embodiment, each of the primary casing 17 and the secondary casing 18 is provided with a U-shape magnetic path directed in the same direction while the casing is closed. However, in the fifth preferred embodiment, the directions of the U-shape magnetic paths of the primary casing 17 and the secondary casing 18 are opposite to each other. A composite dielectric material antenna 22 is disposed between the U-shape magnetic path composed of first to third magnetic components 1 to 3 of the primary casing 17. The magnetic flux φ for a reader/writer passes a route of the fifth magnetic component 5→the fourth magnetic component 4→the sixth magnetic component 6→the second magnetic component 2→the first magnetic component 1→the third magnetic component 3 while the primary casing 17 and the secondary casing 18 are closed. Both ends of a coil component 11 disposed on the first magnetic component 1 are connected to a non-contact IC chip 21.

Usually, the RFID and the cellular phone use frequencies entirely different from each other and, therefore, they have almost no sensitivity to the signal of the other. However, when the communication is performed at point-blank range from the reader/writer, the communication of the cellular phone may be adversely affected by the reader/writer. The communication of the cellular phone can be prevented from being adversely affected by the reader/writer through the use of a composite dielectric material antenna composed of, for example, a dielectric material powder and a resin, as a main antenna for such a cellular phone, in which the frequency is high and it is difficult to use a magnetic material and disposition of the antenna so as to be surrounded by the U-shape magnetic path composed of the magnetic components 1 to 3. That is, a strong electromagnetic field of the reader/writer is applied to the cellular phone during the RFID communication. However, the main antenna for the cellular phone is magnetically shielded from the strong electromagnetic field of the reader/writer by the above-described U-shape magnetic path. Therefore, the electromagnetic field is prevented from entering the main antenna used for the cellular phone. To achieve this effect, it is preferable that the magnetic components 1 to 3 are formed from a material having a large magnetic permeability in the vicinity of the frequency to be used by the RFID and a small magnetic permeability (relative magnetic permeability is about 1) in the communication frequency band of the cellular phone.

A cellular phone according to a sixth preferred embodiment will be described below with reference to FIG. 7 to FIG. 10.

Figure 7:
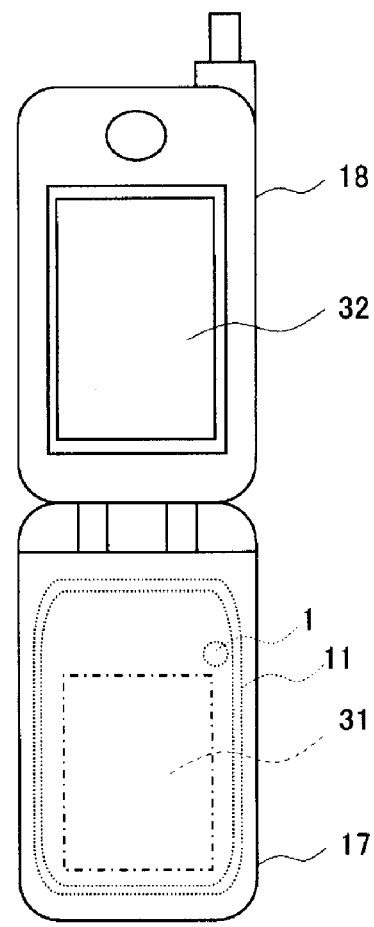
FIG. 7 is a diagram showing the configuration of a cellular phone provided with a coil antenna structure according to a sixth preferred embodiment of the present invention.
Figure 8:
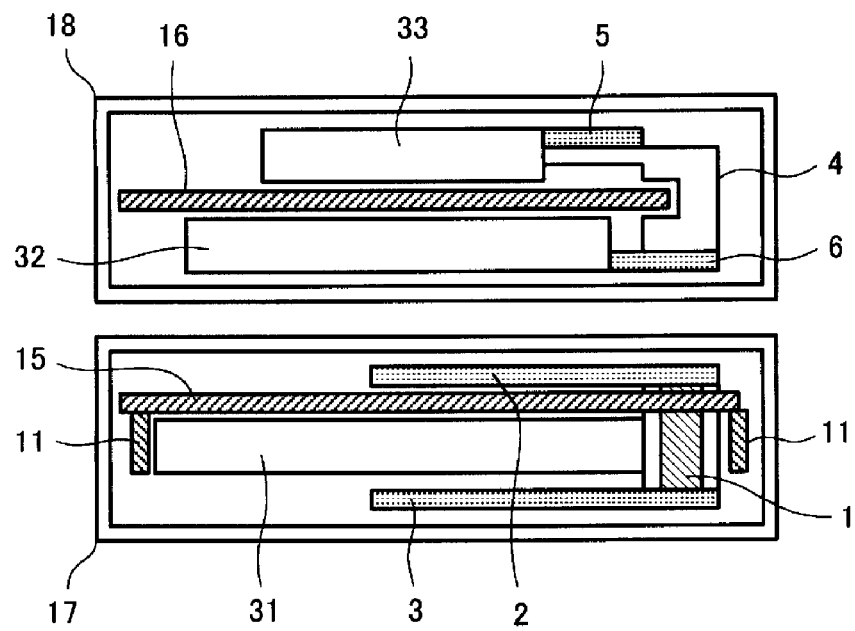
FIG. 8 is a sectional view showing the configuration of the cellular phone according to the sixth preferred embodiment of the present invention.

This cellular phone has a so-called clamshell structure in which a secondary casing 18 is connected to a connection pivot of a primary casing 17 so as to be freely opened or closed. FIG. 7 is an external view of a cellular phone in the state in which the secondary casing is opened relative to the primary casing. FIG. 8 is a sectional view in the state in which the secondary casing 18 is closed relative to the primary casing 17. The connection pivot is not shown in FIG. 8.

In the examples shown in the first to the fifth preferred embodiments, the coil component 11 is wound in the close vicinity of the first magnetic component 1. In the sixth preferred embodiment, as shown in FIG. 7, a coil component 11 defining a loop surface extending in the principal surface direction of the primary casing 17 is provided. In this example, a battery pack 31 inside of the primary casing 17 is included in the inside of the loop surface formed by the above-described coil component 11. The secondary casing 18 is provided with a liquid crystal display panel 32. For the coil component 11, for example, a coil pattern including about 3 turns is provided on a polyimide film.

In the examples shown in the first to the fifth preferred embodiments, the first magnetic component formed of sintered ferrite is disposed outside the portion occupied by the substrate in the casing. In the sixth preferred embodiment, as shown in FIG. 8, the first magnetic component 1 penetrates a substrate 15 at a predetermined location. The second and the third magnetic components 2 and 3 are composed of magnetic sheets extending in the principal surface direction of the primary casing 17, and are disposed in the vicinity of the lower surface and in the vicinity of the upper surface, respectively, of the primary casing 17 so as to sandwich the first magnetic component 1. In the secondary casing 18, a substrate 16, and liquid crystal display panels 32 and 33, are provided and, in addition, a fourth magnetic component 4 formed of a ferrite composite material is disposed at a location in the vicinity of an end portion of the substrate 16 so as not to penetrate the substrate 16.

Furthermore, magnetic components 5 and 6 composed of magnetic sheets are disposed so as to sandwich this fourth magnetic component 4.

The relative magnetic permeability of the above-described ferrite composite material is about 10, and the relative magnetic permeability of the above-described sintered ferrite is about 70 at a frequency to be used by the RFID of about 13.56 MHz.

As described above, the substrate 15 on the primary casing 17 side tends to be larger than the substrate 16 on the secondary casing 18 side. If the first magnetic component 1 is disposed so as to penetrate the substrate 15, the following problems occur.

Figure 9A:
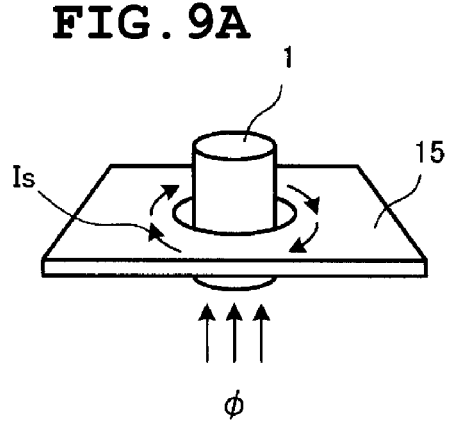
FIGS. 9A and 9B are a partial plan view showing the configuration of a substrate in the inside of the cellular phone according to the sixth preferred embodiment of the present invention.

Since an electrode pattern (in particular, a ground electrode) is disposed on the substrate 15, if a magnetic flux penetrates the electrode pattern, an induced current (eddy current) is generated in the electrode pattern. FIG. 9A shows the state thereof. When a ground electrode is disposed on the substrate 15, if an alternating magnetic flux φ passes the first magnetic component 1, an eddy current Is flows due to electromagnetic induction. The effective magnetic permeability of the first magnetic component 1 formed from ferrite is reduced by a counter-electromotive force caused by the eddy current.

Figure 9B:
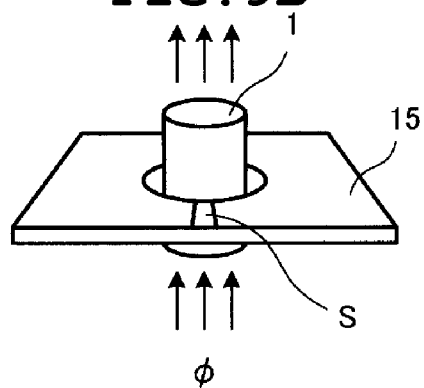

Consequently, as shown in FIG. 9B, an incision portion S extending in a direction farther from the first magnetic component 1 is disposed in the electrode pattern (ground electrode) of a portion surrounding the first magnetic component 1 of the substrate 15.

Figure 10:
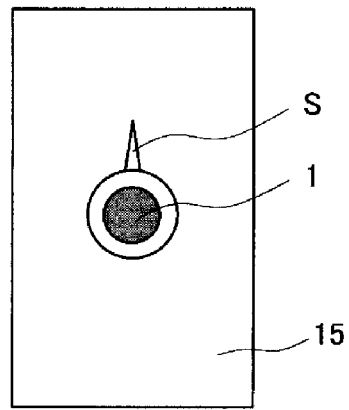
FIG. 10 is a partial perspective view showing the configuration of the inside of the cellular phone according to the sixth preferred embodiment of the present invention.

FIG. 10 is a partial plan view of the substrate 15 provided with the incision portion S. The eddy current Is generated by the magnetic flux passing the first magnetic component 1 tends to flow around the first magnetic component 1. However, since the incision portion S is disposed as described above, the flow route of the eddy current Is in the vicinity of the first magnetic component is cut. As a result, generation of the counter-electromotive force caused by the eddy current Is is suppressed, and reduction of the effective magnetic permeability of the first magnetic component 1 is suppressed.

It is essential only that the above-described incision portion S is disposed in the electrode pattern. However, the incision portion may be disposed in the entire substrate 15.

The above-described first magnetic component 1 is formed by, for example, integrally disposing a composite material (ferrite composite material) including a ferrite powder and a resin around (side portion) a cylindrical sintered ferrite. Since the composite material is disposed around the sintered body, as described above, the magnetic resistance of the magnetic path is reduced and, in addition, high impact resistance is achieved. Therefore, even when a strong impact is imposed on the cellular phone due to drop or other external force, breakage of the first magnetic component is prevented. The same is true for the fourth magnetic component.

In the example shown in FIG. 8 and FIGS. 9A and 9B, the first magnetic component 1 penetrates the substrate 15 on the primary casing 17 side. However, the same can be applied in the case where the fourth magnetic component 4 penetrates the substrate 16 on the secondary casing 18 side. In that case, it is recommended that the substrate 16 is provided with an incision portion for suppressing an eddy current.

A cellular phone according to a seventh preferred embodiment will be described below with reference to FIG. 11.

Figure 11:
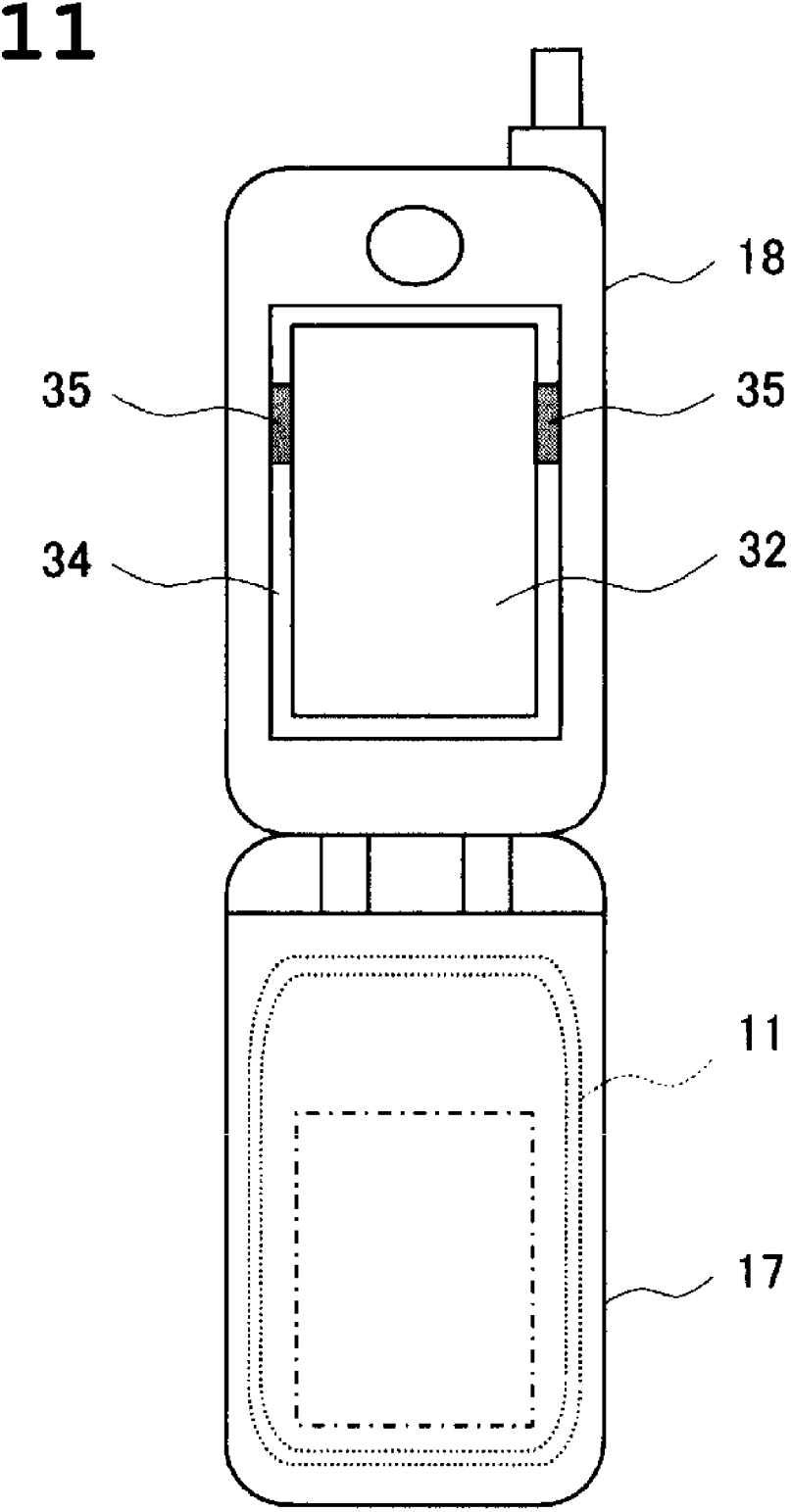
FIG. 11 is a diagram showing the configuration of a cellular phone according to a seventh preferred embodiment of the present invention.

In FIG. 11, the configuration of the inside of the primary casing 17 and the secondary casing 18 are substantially the same as those in the sixth preferred embodiment shown in FIG. 8. In FIG. 11, the primary casing 17 is provided with a coil component 11 similar to that in the cellular phone shown in the sixth preferred embodiment. The secondary casing 18 is provided with a liquid crystal display panel 32. In order to suppress unnecessary emission of a harmonic noise generated in the dynamic driving of a large and high-resolution liquid crystal display panel, an electrically conductive frame 34 made of an aluminum alloy, magnesium amalgam, or other suitable material is disposed around the liquid crystal display panel 32 in the secondary casing 18 to be provided with this liquid crystal display panel 32.

Such an electrically conductive frame defines a loop defined by an electrically conductive component. Therefore, in the state in which the secondary casing is closed relative to the primary casing 17, a magnetic flux penetrating the coil component 11 also passes in the loop of the above-described electrically conductive frame 34, and an induced current is generated in the electrically conductive frame 34 due to the magnetic flux, so that a counter-electromotive force is generated. As a result, the effective magnetic permeability of a magnetic path composed of the magnetic components 1, 2, and 3 disposed on the primary casing 17 side and the magnetic components 4, 5, and 6 disposed on the secondary casing 18 side is reduced.

Consequently, in order that the electrically conductive frame 34 does not define a loop, as shown in FIG. 11, nonconductive portions 35 are disposed at midpoints thereof. In this manner, the above-described induced current does not flow through the electrically conductive frame 34, and reduction of the effective magnetic permeability of the above-described magnetic path is prevented.

A cellular phone according to an eighth preferred embodiment will be described below with reference to FIGS. 12A and 12B.

In the example shown in FIG. 11, when the fourth magnetic component is disposed in the secondary casing 18, the nonconductive portions 35 are disposed in the electrically conductive frame 34 and, thereafter, the fourth magnetic component is disposed in the nonconductive portions 35. In an example shown in the eighth preferred embodiment, the fourth magnetic component 4 is disposed outside the loop defined by the electrically conductive frame 34.

Figure 12A:
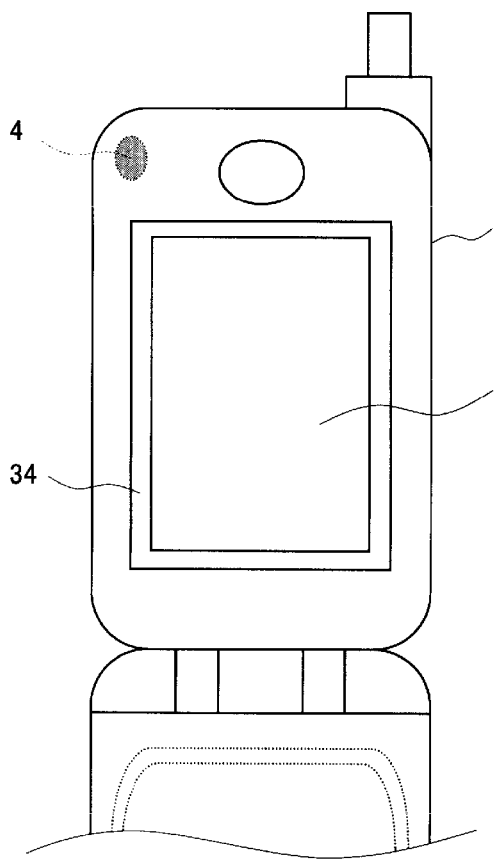
FIGS. 12A and 12B are diagrams showing the configuration of a cellular phone according to an eighth preferred embodiment of the present invention.
Figure 12B:
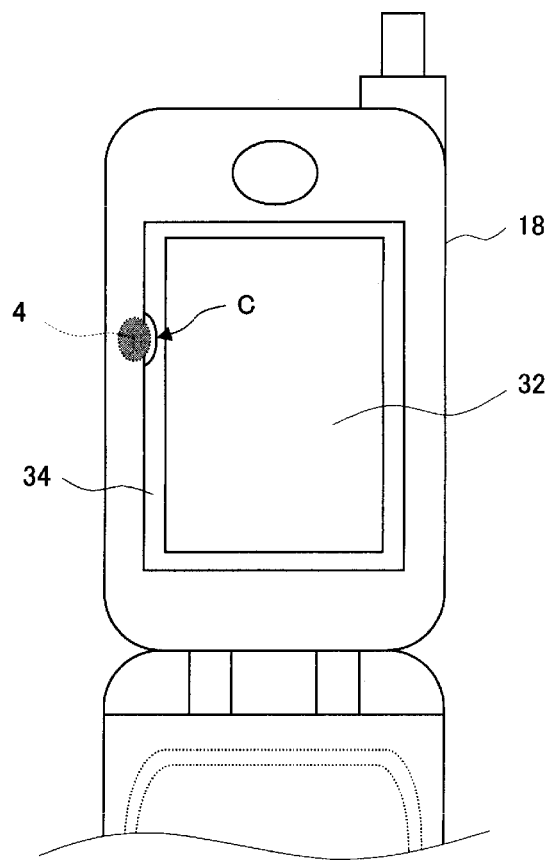

In an example shown in FIG. 12A, a magnetic component 4 is disposed in the vicinity of an end portion of a secondary casing 18. In an example shown in FIG. 12B, a magnetic component 4 is disposed in the vicinity of an electrically conductive frame 34. In addition, in order that the electrically conductive frame 34 disposed in the inside of the secondary casing 18 is as wide as possible, a constriction portion C is provided in a portion of the electrically conductive frame 34 and, thereby, structural interference with the fourth magnetic component 4 is prevented.

In the above-described structure, the electrically conductive frame 34 provides an electrical loop and, therefore, the effect of suppressing unnecessary emission of a harmonic noise generated in the dynamic driving of a liquid crystal display panel is maintained.

A cellular phone according to a ninth preferred embodiment will be described below with reference to FIG. 13.

Figure 13:
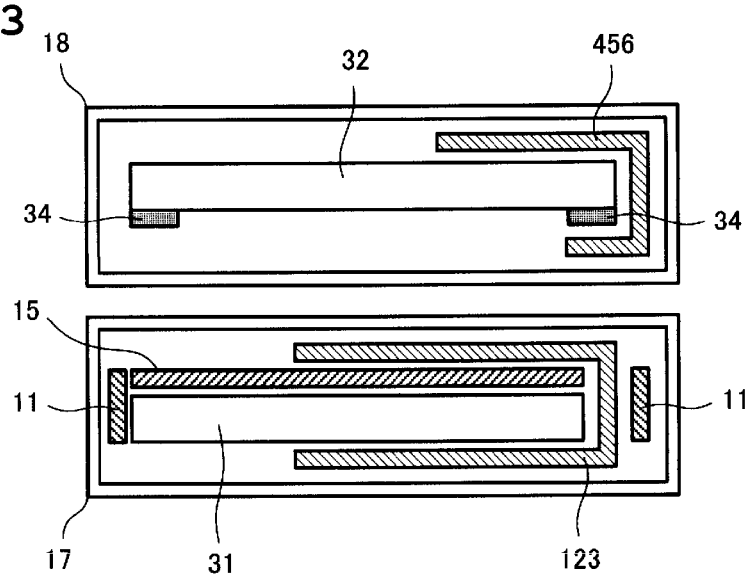
FIG. 13 is a sectional view showing the configuration of a cellular phone according to a ninth preferred embodiment of the present invention.

FIG. 13 is a sectional view of a section including both a primary casing 17 and a secondary casing 8 in the state in which the secondary casing 18 is closed relative to the primary casing 17. A substrate 15, a battery pack 31, and a coil component 11 are disposed in the inside of the primary casing 17 and, in addition, a magnetic material sheet 123 is disposed inside the loop defined by the coil component 11. This magnetic material sheet 123 is composed of an integral magnetic material sheet continuously extending from the bottom surface of the primary casing 17, through end surfaces of the battery pack 31 and the substrate 15, to the upper surface of the substrate 15.

A liquid crystal display panel 32 and an electrically conductive frame 34 are disposed in the secondary casing 18 and, in addition, a magnetic material sheet 456 is continuously disposed from one surface of the liquid crystal display panel 32, through an end surface, to the other surface so as to define a magnetic path outside the electrically conductive frame 34. This magnetic material sheet 456 is composed of an integral magnetic material sheet continuously extending from one surface of the secondary casing 18, through end surfaces of the electrically conductive frame 34 and the liquid crystal display panel 32, to the other surface of the secondary casing 18.

With the above-described structure, a magnetic path having a route, in which the magnetic flux passes in the loop defined by the coil component 11 and the magnetic flux does not pass the loop defined by the electrically conductive frame 34, is composed of two magnetic material sheets 123 and 456 in the state in which the secondary casing 18 is closed relative to the primary casing 17.

When the above-described magnetic material sheets 123 and 456 are provided, a magnetic path is provided in a limited amount of space in the casing, and a required amount of magnetic flux density passing through the coil component 11 is ensured without increasing the size of the apparatus.

A cellular phone according to a tenth preferred embodiment will be described below with reference to FIGS. 14A-14C and FIG. 15.

Figure 14A:
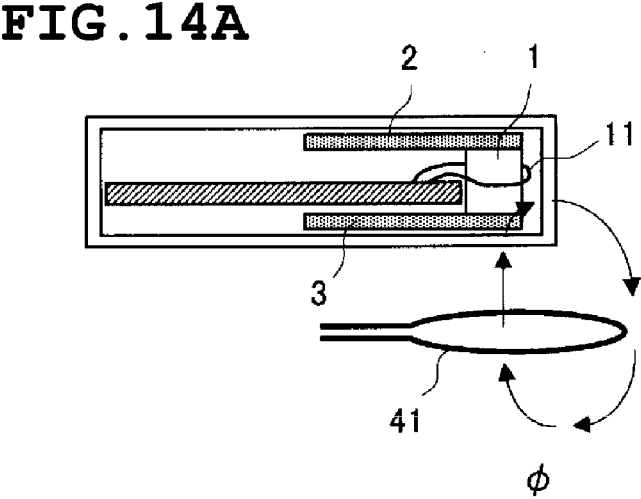
FIGS. 14A-14C are diagrams showing the configuration of a cellular phone according to a tenth preferred embodiment of the present invention.
Figure 14B:
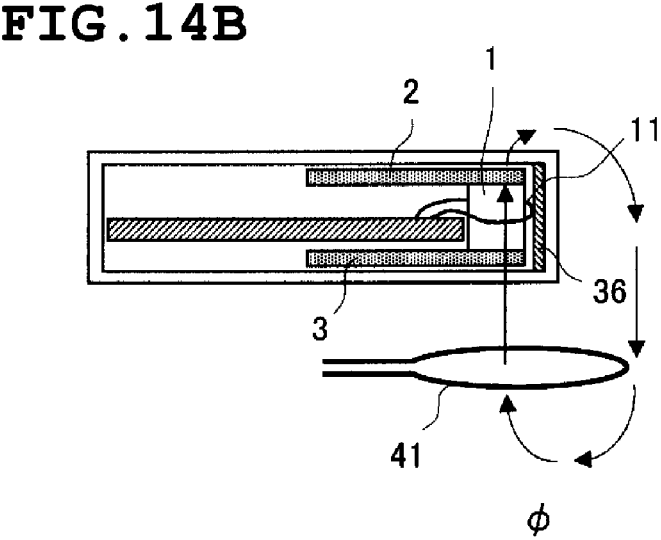

FIGS. 14A and 14B show the relationship between a magnetic path composed of first to third magnetic components 1 to 3 and a reader/writer antenna 41. In the case where the magnetic permeability of the first magnetic component 1 formed from cylindrical ferrite is not adequately high, as shown in FIG. 14A, a magnetic path, in which a magnetic flux φ introduced from the reader/writer 41 to the first magnetic component 1 is returned to the reader/writer antenna 41 before passing the coil component 11, is provided. Even in the case where the magnetic permeability of the first magnetic component 1 is adequately high, a similar phenomenon occurs depending on the magnetic resistance of a route in which the magnetic flux passed through the first magnetic component 1 passes air and returns to the reader/writer antenna 41.

Consequently, as shown in FIG. 14B, a magnetic barrier component 36 for suppressing the passage of a magnetic flux is disposed in a route in which a magnetic flux does not pass the coil component 11 and returns to the reader/writer antenna 41. It is recommended that a conductor is used as this magnetic barrier component 36. For example, metal foil, e.g., a copper foil tape, metal thin plates, e.g., a copper piece, and metal meshes, e.g., a copper mesh, may be used.

Figure 14C:
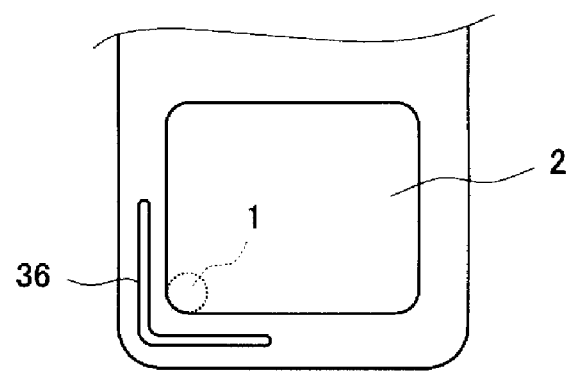

FIG. 14C is a plan view showing the positional relationship between the first magnetic component 1 and the magnetic barrier component 36. In this manner, the magnetic barrier component 36 is disposed in directions opposite to extension directions of the second and the third magnetic components from the first magnetic component at a location (inner surface of the casing) a predetermined distance from the first magnetic component 1. With this structure, the route of a magnetic flux, which does not pass the coil component 11 and tends to take a shortcut, is interrupted and magnetic flux leakage is prevented. The above-described magnetic barrier component 36 may be affixed to the first magnetic component 1.

Figure 15:
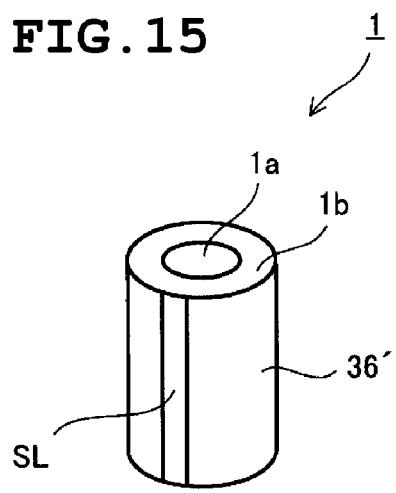
FIG. 15 is a perspective view showing the configuration of a magnetic component of the cellular phone according to the tenth preferred embodiment of the present invention.

FIG. 15 is a diagram showing an example of another configuration of the magnetic barrier. In this example, a composite material 1b composed of a ferrite powder and a resin is disposed around sintered ferrite 1a, and a magnetic barrier component 36' formed from a plating film through electroless copper plating is disposed on the side surface of this composite material 1b. The copper plating film formed on the side surface of the first magnetic component 1, as described above, functions as the magnetic barrier component. If the magnetic barrier component 36' is formed entirely around the side surface of the cylindrical first magnetic component 1, the above-described induced current problem occurs. Therefore, the magnetic barrier component 36' is formed at a location except for the portion indicated by a slit line SL such that the magnetic barrier component 36' does not form a loop.

In this example, the composite material 1b is provided. However, a film-shaped magnetic barrier component 36' may be formed by performing copper plating directly on the side surface of the cylindrical sintered ferrite or by baking a copper paste in which a copper powder is dispersed in a vehicle.

The copper plating film or the baked film of the copper paste defining the magnetic barrier may not always be formed into a continuous film over the entire surface, but may be formed into a predetermined pattern, e.g., a mesh pattern.

A cellular phone according to an eleventh preferred embodiment will be described below with reference to FIGS. 16A and 16B and FIG. 17.

Figure 16A:
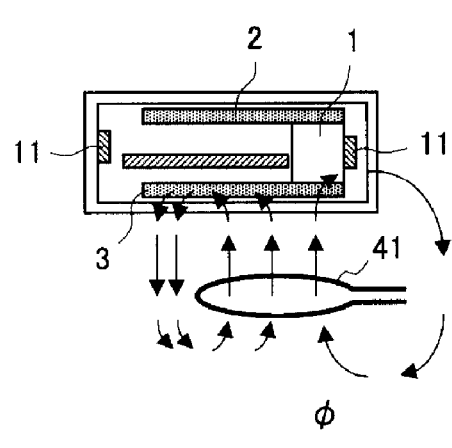
FIGS. 16A and 16B are sectional views showing the configuration of a cellular phone according to an eleventh preferred embodiment of the present invention.
Figure 16B:
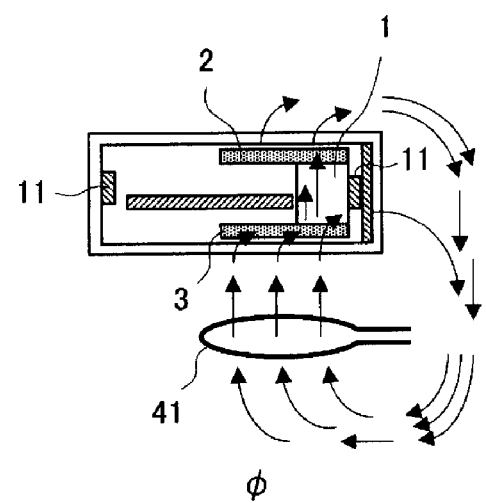

FIGS. 16A and 16B show the relationship between a magnetic path composed of first to third magnetic components 1 to 3 and a reader/writer antenna 41.

In order that the sensitivity is improved by collecting the magnetic flux φ of the reader/writer antenna 41 and communication is enabled with respect to various arrangements and locations of the casing of the cellular phone, it is necessary to use the second and the third magnetic components 2 and 3 having specific areas. However, if the areas of the second and the third magnetic components 2 and 3 formed from magnetic sheets or other suitable materials are too large, as shown in FIG. 16A, a magnetic path, in which a magnetic flux successfully captured by the third magnetic component 3 returns directly to the reader/writer antenna 41 without passing the coil component 11, is produced. Likewise, in the case where the second magnetic component 2 is aimed at the reader/writer antenna 41, a magnetic flux captured by the second magnetic component 2 also returns directly to the reader/writer antenna 41 without passing the coil component 11.

Conversely, if the areas of the second and the third magnetic components 2 and 3 are too small, the convergence of the magnetic flux is reduced, and problems occur in that a magnetic flux passing through the coil component 11 is reduced, or the sensitivity greatly varies depending on the positional relationship between the reader/writer antenna 41 and the casing.

When the size of the second and the third magnetic components 2 and 3 are appropriate, as shown in FIG. 16B, the magnetic flux passes through the coil component 11 and, thereby, adequate communication sensitivity is ensured.

As described above, there is a tradeoff relationship between the areas of the second and the third magnetic components 2 and 3 and the communication sensitivity and the stability thereof.

Therefore, in the eleventh preferred embodiment, the magnetic component is divided in order to ensure the communication sensitivity and reduce variations in communication sensitivity due to the positional relationship between the reader/writer antenna 41 and the casing.

Figure 17A:
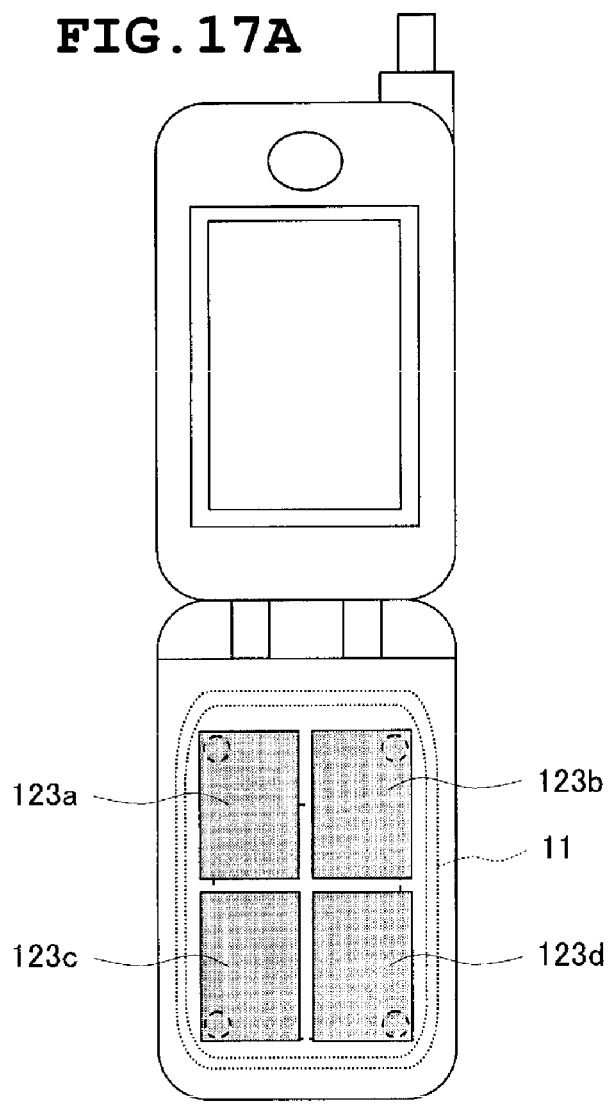
FIGS. 17A and 17B are diagrams showing the configuration of the cellular phone according to the eleventh preferred embodiment of the present invention.
Figure 17B:
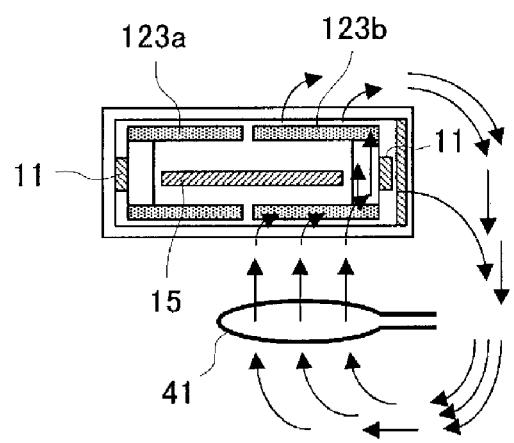

FIGS. 17A and 17B show a specific example thereof. As shown in FIG. 17A, four magnetic paths are defined in a loop of the coil component 11. Each magnetic path is composed of a first magnetic component formed from cylindrical sintered ferrite and second and third magnetic components formed from magnetic material sheets. In FIG. 17A, the second magnetic component composed of rectangular magnetic material sheets 123a, 123b, 123c, and 123d are shown. The third magnetic component is also composed of a magnetic material sheet in the same shape as that of the second magnetic component. In this FIG. 17A, the first magnetic components formed from cylindrical sintered ferrite are shown as circles indicated by broken lines.

The area (area determined from a plan view) of each magnetic material sheet defining the second or the third magnetic component is specified to be a size which enables the magnetic flux from the reader/writer antenna 41 to effectively pass the coil component, and a plurality of magnetic components having the above-described size are disposed while the number thereof is adequate for filling in the loop formed by the coil component 11. With this structure, the communication sensitivity is ensured and, in addition, the sensitivity variation due to position change of the cellular phone relative to the reader/writer antenna 41 maintained at a low level.

In the example shown in FIGS. 17A and 17B, the first magnetic component is constructed separately from the second and the third magnetic components. However, the first to the third magnetic components may be composed of an integral magnetic material sheet. In such a case, each magnetic material sheet is bent at the end portion of the substrate 15 so as to have a U-shape.

A coil antenna according to a twelfth preferred embodiment will be described below with reference to FIGS. 18A to FIG. 21.

FIGS. 18A-18D are diagrams showing the configuration of first to third magnetic components and a magnetic barrier component.

Figure 18A:
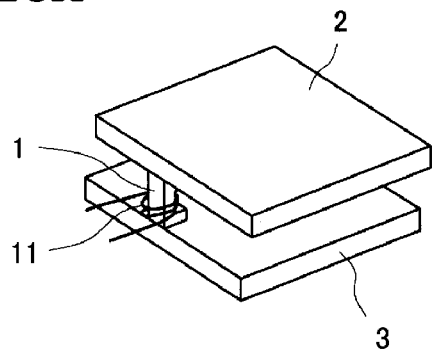
FIGS. 18A-18D are diagrams showing the configuration of a coil antenna according to a twelfth preferred embodiment of the present invention.
Figure 18B:
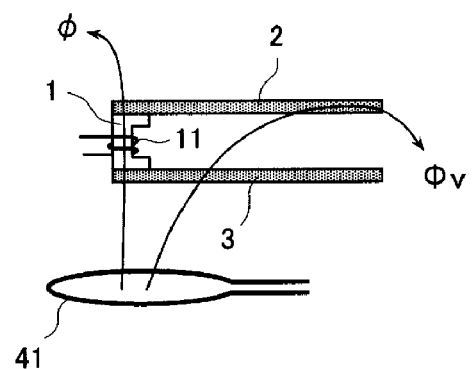

FIG. 18A is a perspective view showing the configuration of the first to third magnetic components, and FIG. 18B is a front view thereof. In this example, the first magnetic component 1 is composed of a U-shaped ferrite core having a relative magnetic permeability of about 70. The second and the third magnetic components 2 and 3 are composite materials including a ferrite powder and a resin material and are composed of a ferrite sheet having a size of about 36×36 mm, a thickness of about 0.6 mm, and a relative magnetic permeability of about 20 to about 50. The first magnetic component 1 is wound with a coil 11.

Figure 18C:
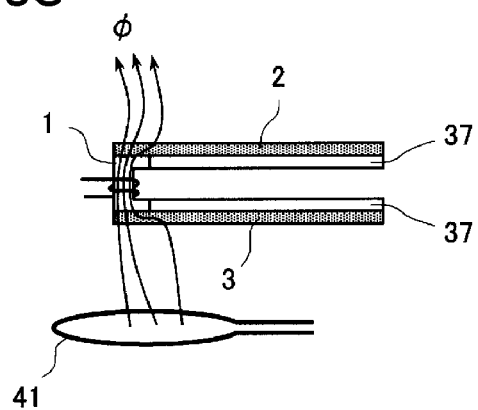
Figure 18D:
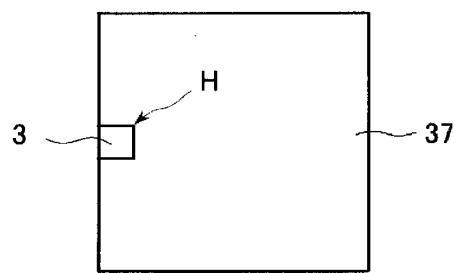

FIG. 18C is a front view of the state in which magnetic barrier components 37 are disposed relative to a magnetic path composed of the first to the third magnetic components 1 to 3 shown in FIGS. 18A and 18B. FIG. 18D is a plan view of the third magnetic component provided with the magnetic barrier component 37. These magnetic barrier components 37 are made of a copper (Cu) tape, and are affixed to the second and the third magnetic components 2 and 3. This magnetic barrier component 37 is provided with an opening portion H in the center portion of one of the sides thereof, and is disposed so as to avoid positions at which the first magnetic component 1 is in contact with the second and the third magnetic components 2 and 3 and not to surround the perimeter of the first magnetic component 1.

Likewise, the magnetic barrier component 37 is also disposed relative to the second magnetic component 2.

In the case where the above-described magnetic barrier component 37 is not disposed, as shown in FIG. 18B, in addition to a magnetic flux φ, which returns to the reader/writer antenna 41 through the third magnetic component 3→the first magnetic component 1→the second magnetic component 2, a magnetic flux φv, which returns to the reader/writer antenna 41 through the third magnetic component 3→the second magnetic component 2 (that is, not passing the first magnetic component 1) is generated.

On the other hand, as shown in FIG. 18C, when the magnetic barrier components 37 relative to the second and the third magnetic components 2 and 3 are disposed on the opposed surfaces of these second and the third magnetic components 2 and 3, the route of the magnetic flux φv, which tends to return to the reader/writer antenna 41 from the third magnetic component 3 through the second magnetic component 2, is substantially eliminated, and the magnetic flux density of the fundamental route, which returns to the reader/writer antenna 41 through the third magnetic component 3→the first magnetic component 1→the second magnetic component 2, is increased.

For the configuration shown in FIG. 18B and the configuration shown in FIG. 18C, the value of inductance was adjusted such that the resonant frequency of the antenna is about 13.56 MHz, which was the frequency to be used, and a communicatable distance from the reader/writer antenna was measured. As a result, with the configuration shown in FIG. 18B, in which the magnetic barrier component was not provided, the communicable distance was about 131 mm, whereas with the configuration as shown in FIG. 18C, in which the magnetic barrier component 37 was provided, the communicable distance was about 149 mm. In this manner, the communication distance is increased by affixing the magnetic barrier components 37 to the second and the third magnetic components 2 and 3.

A coil antenna according to a thirteenth preferred embodiment will be described below with reference to FIGS. 19A and 19B.

Figure 19A:
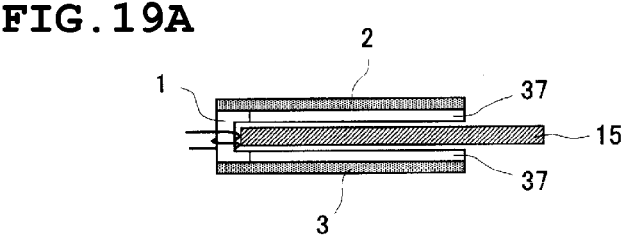
FIGS. 19A and 19B is a diagram showing the configuration of a coil antenna according to a thirteenth preferred embodiment of the present invention.
Figure 19B:
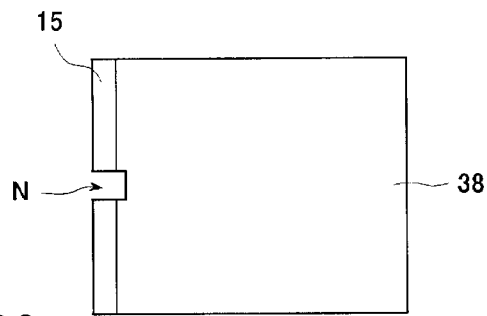

FIG. 19A is a front view of a coil antenna, and FIG. 19B is a plan view of a substrate disposed in the cellular phone together with the coil antenna. This coil antenna is provided with first to third magnetic components 1 to 3 and magnetic barrier components 37 affixed to the inner surface of the second and the third magnetic components, as in the twelfth preferred embodiment shown in FIGS. 18A-18D. Furthermore, a substrate 15 is inserted at a location sandwiched between the second and the third magnetic components 2 and 3 together with the magnetic barrier components 37.

As shown in FIG. 19B, a notch portion N is provided at the center portion of one side of the substrate 15, and the first magnetic component 1 is disposed in this notch portion N. Magnetic barrier components 38 formed from copper (Cu) plating films are disposed on both surfaces of this substrate 15. However, the magnetic barrier components 38 are formed so that the entire perimeter of the first magnetic component 1 is not surrounded by the magnetic barrier components 38. Here, the substrate 15 has a size of about 50×80 mm and a thickness of about 1.6 mm.

The communication distance was further increased from the above-described 149 mm to about 161 mm by inserting the substrate 15 provided with the magnetic barrier components 38, as described above. Furthermore, this value is a value in the state in which the resonant frequency is deviated due to insertion of the substrate 15. Therefore, it is predicted that the communication distance will be further increased by adjusting the inductance such that the resonant frequency approaches about 13.56 MHz, which is the frequency to be used.

As described above, the magnetic barrier component exerts an effect even when being disposed at a location separated from the magnetic component serving as a magnetic flux concentration surface. Therefore, in FIGS. 19A and 19B, a configuration, in which the magnetic barrier component 37 is not disposed, may be adopted.

The magnetic barrier components 38 disposed on both surfaces of the substrate 15 may be formed by affixing metal tapes or metal foil, printing and applying an electrically conductive paste, or other suitable methods instead of plating.

A cellular phone including a coil antenna according to a fourteenth preferred embodiment will be described below with reference to FIG. 20.

Figure 20:
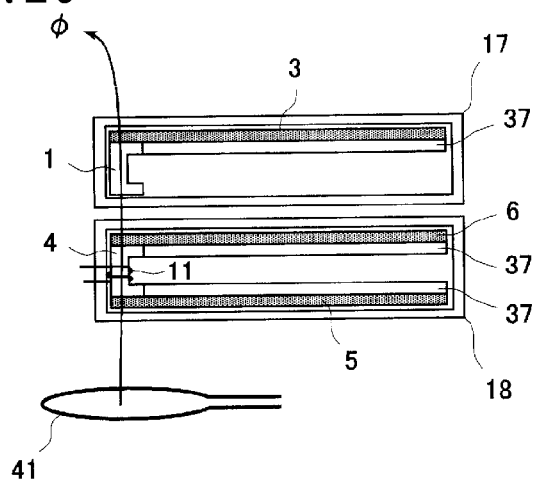
FIG. 20 is a diagram showing the configuration of a cellular phone provided with a coil antenna structure according to a fourteenth preferred embodiment of the present invention.

FIG. 20 is a sectional view of a cellular phone. In this example, a first magnetic component 1 and a third magnetic component 3 are disposed inside of a primary casing 17. (A second magnetic component is not present in this example.) A magnetic barrier component 37 similar to that shown in FIGS. 18A-18D is disposed on the inner surface (a secondary casing 18 side) of the third magnetic component 3.

Fourth to sixth magnetic components 4 to 6 are disposed inside of the secondary casing 18. Magnetic barrier components 37 are disposed on opposed inner surfaces of the fifth and the sixth magnetic components 5 and 6. The fourth magnetic component 4 is wound with a coil component 11.

Each of the magnetic barrier components 37 disposed on the magnetic components 3, 5, and 6 is formed from a copper (Cu) tape.

When a cellular phone having a clamshell structure, as described above, is moved close to an antenna of a reader/writer while the primary casing 17 and the secondary casing 18 are closed, the third magnetic component 3 defines a magnetic flux concentration surface on the primary casing 17 side. The route of a magnetic flux, which does not pass the fourth magnetic component 4 provided with the coil component 11 and returns to the reader/writer antenna 41, is interrupted by disposing the magnetic barrier component 37 on this third magnetic component 3. Consequently, the magnetic flux density passing the coil component 11 is increased correspondingly.

A coil antenna structure according to a fifteenth preferred embodiment will be described below with reference to FIG. 21.

Figure 21:
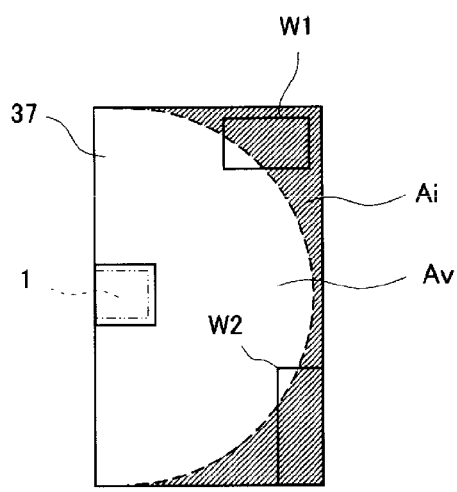
FIG. 21 is a plan view of a magnetic barrier component 37 disposed in a coil antenna according to a fifteenth preferred embodiment of the present invention.

FIG. 21 is a plan view of a magnetic barrier component. This magnetic barrier component 37 is, for example, the magnetic barrier component 37 shown in FIG. 18C, FIG. 19A, or FIG. 20. In the example shown in FIG. 18D, the magnetic barrier components 37 are disposed substantially over the entire surfaces of the magnetic components 2 and 3. However, the magnetic barrier component present in the vicinity of a region, through which the magnetic flux of the reader/writer antenna passes (for example, the first magnetic component 1), acts as a magnetic barrier, and the magnetic barrier is reduced with decreasing proximity thereto. Therefore, in the example shown in FIG. 21, a substantially semi-circular portion having a predetermined radius centering the first magnetic component 1 is considered as a valid region Av, and a portion outside it (a portion indicated by hatching) is considered as an invalid region Ai. Therefore, the magnetic barrier component 37 may not be disposed in regions W1 and W2, which are almost included in the invalid region Ai, and these regions may be used for other purposes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A coil antenna structure comprising:
a tabular casing having a first principal surface and a second principal surface opposed thereto; and
a magnetic component and a coil component surrounding the magnetic component provided in the casing; wherein
the magnetic component extends at least in a thickness direction of the casing and defines a magnetic path from the first principal surface side to the second principal surface side;
the magnetic component is arranged such that a longest dimension of the magnetic component extends in the thickness direction of the casing; and
the thickness direction of the casing is a direction of a smallest dimension of the casing.

2. The coil antenna structure according to claim 1, wherein the magnetic component defines a first magnetic component, and a second magnetic component magnetically connected to the first magnetic component is disposed on the first principal surface side of the casing.

3. The coil antenna structure according to claim 2, wherein a third magnetic component magnetically connected to the first magnetic component is disposed on the second principal surface side of the casing.

4. The coil antenna structure according to claim 3, wherein the first, the second, and the third magnetic components comprise an integral magnetic component.

5. The coil antenna structure according to claim 4, wherein the integral magnetic component is a sheet-shaped magnetic component that is bent over the first principal surface and the second principal surface of the casing.

6. The coil antenna structure according to claim 3, wherein a plurality of groups, each comprising the first, the second, and the third magnetic components, are provided.

7. The coil antenna structure according to claim 3, wherein at least one of the second magnetic component and the third magnetic component is provided separately from the first magnetic component.

8. The coil antenna structure according to claim 7, wherein a gap is interposed between the first magnetic component and the second or third magnetic component provided separately from the first magnetic component.

9. The coil antenna structure according to claim 3, wherein cross-sectional areas of the second and the third magnetic components are greater than a cross-sectional area of the first magnetic component in a principal surface direction of the casing.

10. The coil antenna structure according to claim 9, wherein the second and the third magnetic components are substantially in the shape of one of a sheet and a film.

11. The coil antenna structure according to claim 10, wherein the first magnetic component is substantially in the shape of one of a sheet and a film.

12. The coil antenna structure according to claim 3, wherein a magnetic barrier component arranged to restrict passage of magnetic flux through a route different from the magnetic path including the first magnetic component is disposed on at least one of opposed surfaces of the second and the third magnetic components or in a space sandwiched by the opposed surfaces.

13. The coil antenna structure according to claim 1, wherein the first magnetic component is disposed in the vicinity of an end portion of the casing.

14. The coil antenna structure according to claim 1, wherein a circuit substrate is disposed in the casing, the first magnetic component is disposed so as to penetrate the circuit substrate, and an incision portion extending in a direction farther from the first magnetic component is disposed at least in a conductor of a portion surrounding the first magnetic component of the circuit substrate.

15. The coil antenna structure according to claim 1, wherein the casing comprises an electrically conductive frame arranged to accommodate a liquid crystal display panel, and the first magnetic component is disposed outside a loop defined by the electrically conductive frame.

16. The coil antenna structure according to claim 15, wherein a constriction portion is provided on the outside of the electrically conductive frame, and the first magnetic component is disposed in the constriction portion.

17. The coil antenna structure according to claim 1, wherein a magnetic barrier component arranged to restrict passage of magnetic flux through a route different from the magnetic path including the first magnetic component is disposed in the vicinity of the first magnetic component.

18. The coil antenna structure according to claim 1, wherein the casing defines a primary casing, a secondary casing for defining a clamshell structure together with the primary casing is provided, and the first magnetic component is disposed at a connection pivot portion of the primary casing for connecting the secondary casing.

19. The coil antenna structure according to claim 1, wherein the casing defines a primary casing, a secondary casing capable of being freely opened or closed relative to the primary casing is provided, and a fourth magnetic component is disposed in the secondary casing, the fourth magnetic component extending at least in the thickness direction of the secondary casing, defining a magnetic path from a first principal surface to a second principal surface of the secondary casing, and being magnetically connected to the first magnetic component while the secondary casing is closed relative to the primary casing.

20. The coil antenna structure according to claim 19, wherein a fifth magnetic component magnetically connected to the fourth magnetic component is disposed on the first principal surface side of the secondary casing, and a sixth magnetic component magnetically connected to the fourth magnetic component is disposed on the second principal surface side of the secondary casing.

21. The coil antenna structure according to claim 20, wherein the fourth, the fifth, and the sixth magnetic components comprises an integral magnetic component.

22. The coil antenna structure according to claim 21, wherein the integral magnetic component is a sheet-shaped magnetic component that is bent over the first principal surface and the second principal surface of the secondary casing.

23. The coil antenna structure according to claim 20, wherein a plurality of groups, each comprising the fourth, the fifth, and the sixth magnetic components, are provided.

24. The coil antenna structure according to claim 20, wherein at least one of the fifth magnetic component and the sixth magnetic component is provided separately from the fourth magnetic component.

25. The coil antenna structure according to claim 24, wherein a gap is interposed between the fourth magnetic component and the fifth or sixth magnetic component provided separately from the fourth magnetic component.

26. The coil antenna structure according to claim 20, wherein cross-sectional areas of the fifth and the sixth magnetic components are greater than a cross-sectional area of the fourth magnetic component in the principal surface direction of the secondary casing.

27. The coil antenna structure according to claim 26, wherein the fifth and the sixth magnetic components are substantially in the shape of one of a sheet and a film.

28. The coil antenna structure according to claim 27, wherein the fourth magnetic component is substantially in the shape of one of a sheet and a film.

29. The coil antenna structure according to claim 20, wherein a magnetic barrier component for restricting passage of magnetic flux through a route different from the magnetic path including the fourth magnetic component is disposed on at least one of opposed surfaces of the fifth and sixth magnetic components or in a space sandwiched by the opposed surfaces.

30. The coil antenna structure according to claim 19, wherein the fourth magnetic component is disposed in the vicinity of an end portion of the secondary casing.

31. The coil antenna structure according to claim 19, wherein a circuit substrate is disposed in the secondary casing, the fourth magnetic component is disposed so as to penetrate the circuit substrate, and an incision portion extending in a direction farther from the fourth magnetic component is disposed at least in a conductor of a portion surrounding the fourth magnetic component of the circuit substrate.

32. The coil antenna structure according to claim 19, wherein the secondary casing comprises an electrically conductive frame arranged to accommodate a liquid crystal display panel, and the fourth magnetic component is disposed outside a loop defined by the electrically conductive frame.

33. The coil antenna structure according to claim 32, wherein a constriction portion is provided on the outside of the electrically conductive frame, and the fourth magnetic component is disposed in the constriction portion.

34. The coil antenna structure according to claim 19, wherein a magnetic barrier component for restricting passage of magnetic flux through a route different from the magnetic path including the fourth magnetic component is disposed in the vicinity of the fourth magnetic component.

35. The coil antenna structure according to claim 1, wherein the casing comprises an electrically conductive frame arranged to accommodate a liquid crystal display panel, the frame surrounding the magnetic path, and a non-conductive portion is provided as a portion of the electrically conductive frame.

36. A portable electronic apparatus comprising the coil antenna structure according to claim 1.

37. A coil antenna structure comprising:
a conductor having a relatively low magnetic permeability;
a magnetic component disposed such that a magnetic flux is passed so as to detour around the conductor having the relatively low magnetic permeability; and
a coil component surrounding the magnetic component; wherein
the magnetic component is arranged such that a longest dimension of the magnetic component extends in a thickness direction of the conductor; and
the thickness direction of the conductor is a direction of a smallest dimension of the conductor.

38. The coil antenna structure according to claim 37, wherein the magnetic component defines a first magnetic component, a second magnetic component magnetically connected to the first magnetic component is disposed on at least one end side of the first magnetic component, and a cross-sectional area of the second magnetic component is greater than a cross-sectional area of the first magnetic component in a direction that is substantially perpendicular to an extension direction of the first magnetic component.

39. A portable electronic apparatus comprising the coil antenna structure according to claim 37.

* * * * *